United States Patent
Cope et al.

(10) Patent No.: US 7,669,199 B2
(45) Date of Patent: Feb. 23, 2010

(54) INSTALLATION OF SOFTWARE STACKS INCLUDING UNCOORDINATED PROJECTS

(75) Inventors: Rod Cope, Broomfield, CO (US); Eric Weidner, Highlands Ranch, CO (US)

(73) Assignee: OpenLogic, Inc., Broomfield, CO (US)

( * ) Notice: Subject to any disclaimer, the term of this patent is extended or adjusted under 35 U.S.C. 154(b) by 887 days.

(21) Appl. No.: 11/118,099

(22) Filed: Apr. 28, 2005

(65) Prior Publication Data

US 2006/0036652 A1  Feb. 16, 2006

Related U.S. Application Data

(60) Provisional application No. 60/566,310, filed on Apr. 28, 2004, provisional application No. 60/566,301, filed on Apr. 28, 2004, provisional application No. 60/566,311, filed on Apr. 28, 2004.

(51) Int. Cl.
  *G06F 9/445* (2006.01)
  *G06F 9/44* (2006.01)
  *G06F 17/30* (2006.01)
  *G06F 21/00* (2006.01)

(52) U.S. Cl. .......................... 717/174; 717/106; 707/1; 705/59

(58) Field of Classification Search ................. 717/101, 717/106, 174; 707/1; 705/59
See application file for complete search history.

(56) References Cited

U.S. PATENT DOCUMENTS

| | | | |
|---|---|---|---|
| 5,553,282 A | | 9/1996 | Parrish et al. |
| 5,765,152 A | | 6/1998 | Erickson |
| 5,892,900 A | | 4/1999 | Ginter et al. |
| 7,139,811 B2 | * | 11/2006 | Lev Ran et al. ............. 709/217 |
| 7,185,344 B2 | * | 2/2007 | Grover et al. ............... 719/319 |
| 7,246,156 B2 | * | 7/2007 | Ginter et al. ................ 709/217 |
| 7,418,491 B2 | * | 8/2008 | Childress et al. ............ 709/223 |
| 7,458,062 B2 | * | 11/2008 | Coulthard et al. ........... 717/121 |
| 7,552,093 B2 | | 6/2009 | Levin et al. |
| 2002/0035451 A1 | | 3/2002 | Rothermel |
| 2002/0040469 A1 | | 4/2002 | Pramberger |
| 2002/0049738 A1 | * | 4/2002 | Epstein .......................... 707/1 |
| 2002/0174010 A1 | | 11/2002 | Rice, III |
| 2003/0009740 A1 | * | 1/2003 | Lan ............................ 717/102 |

(Continued)

OTHER PUBLICATIONS

Jeffrey S. Norris, "Mission-Critical Development with Open Source Software: Lessons Learned", Jan. 2004, IEEE Software, pp. 42-49, http://ieeexplore.ieee.org/ielx5/52/28149/01259211.pdf?arnumber=1259211.*

(Continued)

*Primary Examiner*—Wei Y Zhen
*Assistant Examiner*—Chih-Ching Chow
(74) *Attorney, Agent, or Firm*—Marsh Fischmann & Breyfogle LLP; Libby A. Huskey

(57) ABSTRACT

A tool is provided for addressing a number of issues related to installing software stacks including multiple uncoordinated components such as open source projects. The tool selects a plurality of software projects, addresses dependency and resource issues and installs the projects on a computer as a functional stack. A test procedure is also created to verify proper installation. A project filter is also provided for controlling access to or installation of projects in accordance with filter criteria. In this manner, compliance with internal policies regarding the use of open source or other software is facilitated.

28 Claims, 13 Drawing Sheets

U.S. PATENT DOCUMENTS

| | | | |
|---|---|---|---|
| 2003/0051226 A1* | 3/2003 | Zimmer et al. | 717/102 |
| 2003/0135842 A1 | 7/2003 | Frey et al. | |
| 2003/0192029 A1 | 10/2003 | Hughes | |
| 2004/0054566 A1 | 3/2004 | J'Maev | |
| 2004/0073789 A1* | 4/2004 | Powers | 713/165 |
| 2004/0244008 A1* | 12/2004 | Lee | 719/310 |
| 2005/0086030 A1* | 4/2005 | Zeidman | 703/1 |
| 2005/0125358 A1* | 6/2005 | Levin et al. | 705/59 |
| 2005/0183021 A1* | 8/2005 | Allen et al. | 715/747 |
| 2008/0154965 A1* | 6/2008 | Pedersen | 707/104.1 |

OTHER PUBLICATIONS

Carla Freericks, "Open Source Standards on Software Process: A Practical Application", Apr. 2001, IEEE Communications Magzine, pp. 116-123, http://ieeexplore.ieee.org/stamp/stamp.jsp?arnumber=917513&isnumber=19817.*

Brian Fitzgerald et al., "Developing an Information Systems Infrastucture with Open Source Software", Jan. 2004, IEEE Software, pp. 50-55, http://ieeexplore.ieee.org/stamp/stamp.jsp?arnumber=01259216.*

Jon Froehlich et al., "Unifying Artifacts and Activities in a Visual Tool for Distributed Software Development Teams", Proceedings of the 26the International Conference on Software Engineering, pp. 387-396, May 23-28, 2004, http://ieeexplore.ieee.org/stamp/stamp.jsp?arnumber=1317461&isnumber=29176.*

Scacchi, "Strategies for Developing and Deploying Free/Open Source Software", Apr. 26, 2004, Institute for Software Research, UC Irvine, pp. 1-9, "http://web.archive.org/web/20040426004059/http://www.ics.uci.edu/~wscacchi/Presentations/OSS-Strategies/Strategies-Developing-Deploying-FOSS.ppt".*

Frishberg et al., "Getting to Know You: Open Source Development Meets Usability", Apr. 20-25, 2002, CHI2002, pp. 932-933.*

SourceForge.Net, Apr. 23, 2003, pp. 1-3, http://web.archive.org/web/20030423010024/http://sourceforge.net/.*

Diomidis Spinellis et al., "How is open source affecting software development?", Jan. 2004, IEEE Software, pp. 28-33, http://opensource.mit.edu/papers/spinellisszyperski.pdf.*

Berglund, E., et al.; "Open-Source Documentation: In Search of User-Driven, Just-in-Time Writing" Oct. 21-24, 2001; pp. 132-141; ACM 1-58113-295-6/01/0010.

Feller, J., et al.,; "A Framework Analysis of the Open Source Development Paradigm"; 2000, pp. 58-69; International Conference on Information Systems.

* cited by examiner

INSTALLATION OF SOFTWARE STACKS INCLUDING UNCOORDINATED PROJECTS

CROSS REFERENCE TO RELATED APPLICATIONS

This application claims priority from U.S. Patent Application Ser. No. 60/566,310 entitled "OPEN SOURCE APPLICTION DEVELOPMENT TOOLS" which was filed on Apr. 28, 2004, as well as U.S. Patent Application Ser. No. 60/566,301 entitled "OPEN SOURCE SOFTWARE PACKAGE INSTALLATION" filed on Apr. 28, 2004, and U.S. Patent Application Ser. No. 60/566,311 entitled "POST-INSTALLATION TOOLS FOR OPEN SOURCE APPLICATION DEVELOPMENT PACKAGES" filed on Apr. 28, 2004. The entire disclosures of each of these applications are incorporated herein by reference.

FIELD OF THE INVENTION

The present invention relates in general to software projects including open source projects or projects that are otherwise available for stacking and, in particular, to a tool for assembling, installing and supporting or servicing software stacks.

BACKGROUND OF THE INVENTION

Conventionally, packages of software have been formed from proprietary applications. These applications have generally been provided by a single source or by industry partners such that the applications have been developed in a coordinated way to facilitate such packaging. However, the assembly and use of such packages has generally been limited by associated licenses. More recently, open source software has grown rapidly in importance and availability. Generally, open source software is software where the source code is available for copying and modification and whose licenses generally give the user freedom to use the software for any purpose as well as to modify and redistribute the software. In this regard, open source software is distinguished from proprietary software in that the source code of proprietary software is generally not made available to the end user and the licenses for proprietary software generally place significant restrictions on use, copying, modification and redistribution. In addition, open source software is generally made available for free or for a reasonable reproduction fee whereas proprietary software is frequently provided on a for profit basis.

Open source software has a number of potential advantages for end users. First, because the source code is available to the end user and the licenses allow for substantial freedom of use and modification, the end user has significant flexibility to adapt and optimize the code for a particular endeavor. In this regard, the end user is not tied into a particular proprietary system. In addition, studies have shown that open source software tends to be of very high quality. That is, due to the open nature of the software and the opportunity for virtually unlimited peer review, the open source software is generally continually improving in quality. Moreover, because the open source software is generally available for free or at a nominal cost, there is a significant potential to use the open source software in a cost effective manner. For these and other reasons, many governments and other entities have mandated or encouraged a transition from proprietary software to open source software for systems under their control.

At the present time, however, significant obstacles remain with respect to fully realizing the potential advantages of open source software or other independently developed or uncoordinated software. One such challenge is assembling software stacks. Typically, a software system, application or tool ("project") does not function in isolation. Rather, a particular project may require another project (e.g., open source or proprietary) as a prerequisite to its proper operation and, once installed, may be used by other projects. Because of these vertical dependency relationships, end users often require or desire a software stack including multiple projects. Assembling such stacks involves identifying individual projects required for an endeavor as well as addressing the dependency relationships. This may require significant expertise and time. Although some open source providers offer coordinated projects or stacks, open source software tends to be uncoordinated.

Another difficulty associated with the use of uncoordinated software such as certain open source software relates to installation. Installation involves addressing various machine configuration issues, integrating software projects, resolving conflicts and testing for proper interoperation of the individual projects as well as interoperation between the projects and machine components. Again, installation often requires significant expertise and time.

In addition, there are a number of post-installation issues relating to the use of such uncoordinated software. For example, the use of any software may require occasional reference to user manuals and other documentation. Such documentation may not be readily available in the context of a stack including multiple uncoordinated (e.g., open source). Even when documentation is available for individual projects, such documentation may not be adapted for the environment of a particular software stack. Similarly, training materials such as tutorials may not be available or optimized for a software stack environment. Other post-installation issues relate to uninstalling projects or altering installed projects or stacks.

SUMMARY OF THE INVENTION

The present invention relates to assembling, installing and supporting or servicing software stacks composed of multiple projects, including uncoordinated projects. The projects are software components for particular applications such as proprietary software applications and open source projects. A stack is defined by installing two or more projects in a processing environment (single machine or distributed) such that the projects share one or more logical resources such as a function library or are otherwise configured for cooperative and dependent operation. That is, two projects have a dependency relationship where a first one of the projects requires a project, such as the other (second) one of the projects, to perform a function that defines a substantial part of the first project's application. The projects are thus vertically integrated. In this regard, uncoordinated projects are projects that are not specifically preconfigured for such cooperative and dependent operation in a stack. For example, such projects may be developed by multiple parties working independently or by open source developers.

In particular, the present invention is directed to a tool for addressing a number of the above-noted issues relating to software stacks including multiple uncoordinated components. The tool facilitates stack assembly by identifying individual projects, managing dependency relationships and providing an intuitive graphical interface to assist the user. In addition, the tool facilitates installation by addressing machine configuration issues, resolving conflicts and performing at least partially automated testing. The tool also addresses a number of post-installation issues including the generation of appropriate documentation and training tools, as well as by facilitating de-installation of projects as well as modification of replacement projects and software stacks.

In accordance with one aspect of the present invention, a method and apparatus (collectively, "utility") is provided for enabling convenient access to stacks of uncoordinated software projects. Specifically, the utility involves receiving an input regarding a stack of interest, accessing information regarding potential stacks and outputting stack information responsive to the input. From the perspective of a user or user system, the utility involves accessing a system for providing stack information regarding stacks of (formed from) uncoordinated software projects, submitting an input (e.g., to a local processor or remote platform) regarding a stack of interest and receiving stack information responsive to the input. The stack information may include, for example, an identification of the project content of one or more possible stacks, projects for installation as one or more stacks, and/or installation information for one or more possible stacks. In this regard, for example, a stack or information defining a stack may be assembled from projects or project information responsive to the input, or such stacks or information defining stacks may be predetermined and stored. That is, the stack information can be assembled at various times and in various ways. In any event, convenient access can be provided to information useful in assembling and/or installing stacks formed from uncoordinated software projects, e.g., including one or more open source projects.

In accordance with another aspect of the present invention, a utility is provided for use in assembling stacks of software projects. That is, the utility is useful in determining the project content of a stack. It will be appreciated the utility may further be useful in identifying and/or resolving conflicts, dependency characteristics and other issues relating to assembling a stack. The utility involves operating a computer based tool to receive input information regarding a stack of interest, determine at least a first characteristic of a first project of the stack, and provide information regarding a second project of the stack. The input information may, for example, identify a function of this stack, identify the first project for inclusion in the stack or otherwise provide initial information for use in assembling the stack.

Based on this input information, the computer based tool is operative to determine the first characteristic of the first project. The first characteristic may relate, for example, to a dependency relationship of the first project or a resource requirement. In this regard, the computer based tool may identify one or more projects on which the first project depends, one or more projects having a dependency that is satisfied by the first project or may relate to ports or other resource requirements. This characteristic is used to provide information regarding a second project of this stack. Thus, for example, dependency relationships, conflicts and the like may be identified in an output to the user or resolved so as to assist in stack assembly. For example, one or more graphical user interfaces may identify dependencies or conflicts to resolve in order to complete a desired stack assembly.

The utility can be used to facilitate assembly of uncoordinated projects. In this regard, the first and second projects may be uncoordinated and may include open source projects, proprietary projects, other projects or combinations thereof. Preferably, at least one of the projects in the stack operates at a tools or applications layer of the stack above an operating system level of the stack.

According to another aspect of the present invention, a utility is provided for use in assembling stacks by reference to a knowledge base including information regarding a set of supported projects and dependency information. Specifically, the utility involves identifying a set of software projects and determining, for the set of software projects, a set of dependency relationships relating to interoperation of the software projects. A controller includes logic for accessing information reflecting the dependency relationships and relating particular ones of the software projects based on the dependency relationships. In operation, the controller receives a user input indicating an interest in assembling a stack of projects and identifying, at least by type, at least a first project for inclusion in this stack. Based on this user input and the dependency relationships, the controller identifies at least a second project for inclusion in the stack. For example, a user may indicate a particular function to be performed by the stack or a particular project that the user is interested in using. In the case of an identified function, the controller may identify project options associated with the function from which the user can select a desired project. In any case, once a project is identified, the stored dependency relationships can be used to identify prerequisite projects, projects used by the first project and further associated dependencies. It will be appreciated that such dependency relationships may exist between first and second groups of programs. In that case, each group effectively functions as a project and the assembly of the groups defines a stack. In this manner, the user can efficiently assemble a stack where dependency relationships are satisfied across the stack.

According to a still further aspect of the present invention, a utility is provided for filtering projects in connection with a request to access or use projects. It has been recognized that the ready availability of externally developed projects is problematic for many entities. In particular, in the context of open source projects, such projects are readily available at no or a nominal cost. As a result, personnel may sometimes access such projects without consideration of compliance with license terms or company policy. Moreover, as noted above, open source licenses can include a variety of terms and obligations regarding reproduction or use of the open source software. In many cases, entities may be unaware that such open source projects are being used until undesired consequences have occurred. Accordingly, it would be desirable to provide a tool to assist such entities in facilitating compliance with policies developed by the entity in this regard.

An associated utility in accordance with the present invention involves defining filter criteria relating to access or use of software projects, receiving a request for access to or use of one or more software projects and operating a computer based tool to process the request in accordance with the filter criteria to provide an output responsive to the request. The filter criteria reflect a policy affecting the requestor independent of any rights granted by the providers of the software projects or lack thereof. Thus, for example, the filter criteria may define what projects may be accessed, by whom, and for what purpose. For example different criteria may apply to different personnel (e.g., software developers, IT personnel, accounting) and for different purposes (strictly internal use versus incorporation into product). The filter may be implemented in connection with a stack assembly and installation tool. In this regard, graphical user interfaces may only present project options that are appropriate for the person or purpose at issue or filtered projects may be otherwise unavailable for selection in connection with such user interfaces. In this manner, adherence to the entity's policy concerning projects may be enforced. Projects may be filtered, for example, on a project-by-project basis, based on a type of or category of the projects, or based on a license association of the project.

In accordance with a still further aspect of the present invention, a utility is provided for installing uncoordinated software. An associated system involves a configuration module for configuring a number of uncoordinated software projects into a stack and an installer for installing the stack on a computer. For example, the configuration module may configure the projects into a stack responsive to a request from a user or a user system. In this regard, such a stack may be identified with the aid of an assembly tool as discussed above. Alternatively, the projects may be configured into a stack prior to handling a specific request. Preferably, the stack is configured in a manner that resolves dependency issues with respect to the included projects. In addition, the configuration module may take into account the state of the machine on which the stack is to be installed in connection with considering such dependency issues or resolving potential conflicts. From the perspective of a user or user system, the utility involves submitting input information regarding a stack of interest to a configuration module and receiving installation information. Such installation information may include, for example, information regarding an installation procedure, projects reflecting a configuration for use in the stack and/or installation tools. The utility thus addresses a number of problematic issues relating to installation of stacks formed from uncoordinated projects.

In accordance with a still further aspect of the present invention, a utility is provided for use in installing a stack of uncoordinated projects on a machine or other system designated by a user. An associated installer may be resident on the designated system or interconnected to a system via a LAN or WAN. In addition, the installer may be operatively associated with an assembly utility as described above or may operate independently. The installer utility is operative to receive input information regarding a stack of interest, determine at least a first characteristic of a first project of the stack, and provide information regarding a second project of the stack. The input information may, for example, identify a function of the stack or identify the first project, at least by type. In response to this information, the utility may identify one or more projects having a dependency relationship with the first project or a resource requirement of the first project. Since such information may be used to identify the second project so as to resolve a dependency relationship or avoid a resource conflict. The utility is useful for installing stacks including uncoordinated projects (e.g., open source projects) where at least one of the projects operates at a tools or applications layer of a stack above an operating system level.

In accordance with another aspect of the present invention, a utility is provided for assisting with post-installation support in connection with an installed stack of uncoordinated projects. This support utility may be provided in conjunction with assembly and/or installation utilities as noted above or independently. Moreover, the support utility may operate in connection with a local system or may be accessed via a network, e.g., the Internet. The support utility involves receiving an identification of a stack including a number of uncoordinated software projects, selectively accessing storage to obtain support information specific to that stack and outputting the support information to a user. The support information may include, for example, a tutorial or documentation specifically tailored for the package. Support information may be preassembled and indexed to the stack or may be stored as separate chunks of information that are assembled in response to a request. In this regard, documentation may be stored as structured content, e.g., associated with metadata such as XML tags, identifying a context or association of the data, for example, an association with a particular project. Text and/or graphics may be assembled in this regard. In addition, the support information may be selected based on operating environment information for the stack such as information relating to the machine of a user or operating system of a user.

In accordance with yet another aspect of the present invention, a utility is provided for managing updates in connection with an installed stack of uncoordinated projects. It will be appreciated that updates relating to a stack such as project updates, dependency updates and support information updates may become available from time to time. Managing such updates can be problematic, particularly in the context of stacks of uncoordinated software projects. The utility of the present invention involves receiving information regarding the availability of an update concerning a stack, identifying a stack potentially affected by the update, and providing update information to a user or user system. The update information may include, for example, a notification to a user that updates are available, updated software and/or installation information. In this regard, an update may be automatically installed or installed upon receiving an indication from a user that the update is desired. Preferably, update installations are accomplished while leaving at least a portion of the previously installed stack in an installed state, e.g., without uninstalling one or more projects of the stack. An associated update installation process may involve determining an installation sequence, resolving any dependency or resource conflicts, performing an installation of the update in accordance with the determined installation procedure and testing the update upon installation. Associated support materials may also be made available in connection with the update.

In accordance with a further aspect of the present invention, a utility is provided for enabling substitution of projects within a stack of software projects. The utility involves receiving an input in relation to an installed stack including a plurality of software projects and, in response to the input, substituting for a first one of the projects a substituted project having substantially equivalent functionality. It will be appreciated that this utility is particularly, though not exclusively, useful in connection with open source projects that often have licensing terms that provide significant flexibility in configuring stacks. For example, the utility may be used to substitute a second database project in place of a first database project in a given stack. In this manner, a user can experiment with different projects to build a stack with optional performance for a given endeavor.

In accordance with yet another aspect of the present invention, a utility is provided for managing licensed information. The utility involves storing public information and private information concerning a given software license; providing access to at least a portion of the public information; receiving a request for access to the private information; responsive to the request, verifying an authorization to access the private information, and selectively providing access to the private information based on the verification. For example, in connection with a request to access the private information, a user may be prompted to enter a password or other authorization information. Such authorization information may be used to encrypt and decrypt the private information so as to inhibit unauthorized accesses to such information.

BRIEF DESCRIPTION OF THE DRAWINGS

For a more complete understanding of the present invention and further advantages thereof, reference is now made to the following detailed description taken in conjunction with the drawings, in which.

DETAILED DESCRIPTION OF THE INVENTION

In the following description, the invention is set forth in the context of a graphical installer system that encompasses stack assembly, installation and support functionality. It should be appreciated that, as noted above, such functionality may be provided independently, rather than as part of an integrated system, in accordance with the present invention. Moreover, it will be appreciated that various aspects of the invention have application beyond the specific context described below. Accordingly, this description should be understood as exemplifying the invention, and not by way of limitation.

In the following description, the application development environment is first described in relation to the open source software movement. This represents an illustrative application of stacking uncoordinated projects. Thereafter, a system architecture in accordance with the present invention is described. Finally, specific functionality for stack assembly, installation and post-installation support is described in detail.

I. The Open Source Application Development Environment

The present invention is directed to a tool for use in assembling, installing and supporting software stacks including, for example, stacks that include one or more open source projects. As noted above, stacks including open source projects are particularly apt for illustrating the various aspects of the present invention, as open source projects are typically uncoordinated and are typically associated with licenses that provide significant freedom for configuration in custom stacks. Indeed, the flexibility to modify and combine such projects as desired is a principal motivation for the open software movement. However, it will be appreciated that stacks may be formed from proprietary applications or a combination of open source projects, proprietary applications and other uncoordinated projects where licenses allow. Indeed, it is anticipated that such combinations will become increasingly common. In any event, the invention has particular advantages in the context of forming stacks of uncoordinated software components, i.e., projects or applications that are not preconfigured to share logical resources such as function libraries or otherwise specifically configured for cooperative and dependant operation in a stack.

Figure 1:
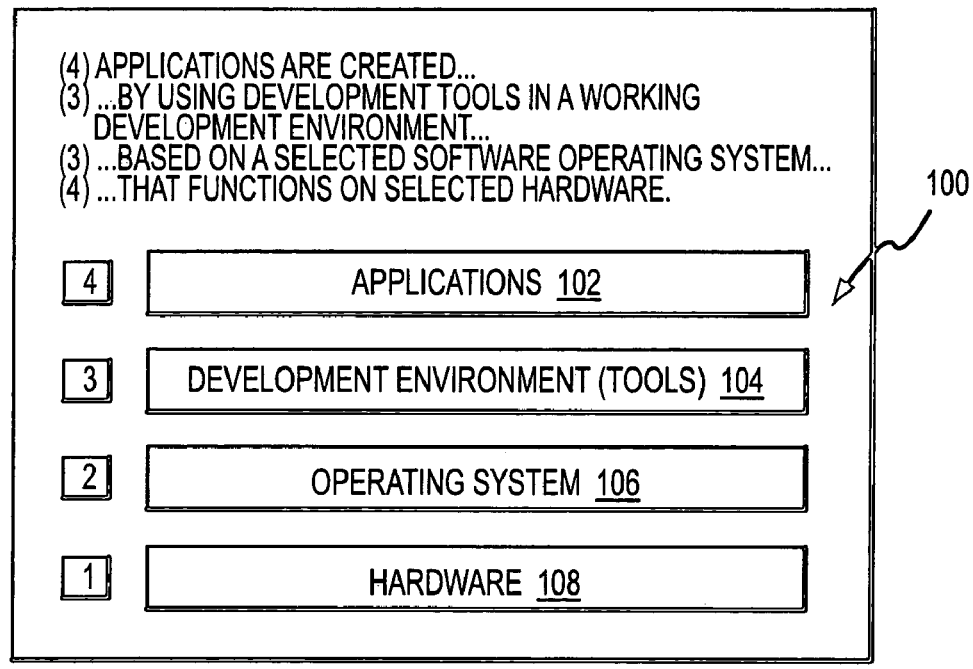
FIG. 1 is a graph illustrating the layers of an application development environment.

In the examples below, such stacks are described in the context of an application development environment. In this regard, an application development environment refers to a stack that includes at least one project, that is, an application or a development environment tool, operating above the operating system or hardware levels. This may be understood by reference to FIG. 1. As shown in FIG. 1, a full software development environment 100 generally includes an applications layer 102, a development environment tool layer 104, an operating system layer 106 and a hardware layer 108. Generally, applications 102 are created by using development tools 104 in a working development environment based on a selected software operating system 106 that functions on selected hardware 108.

Figure 2:
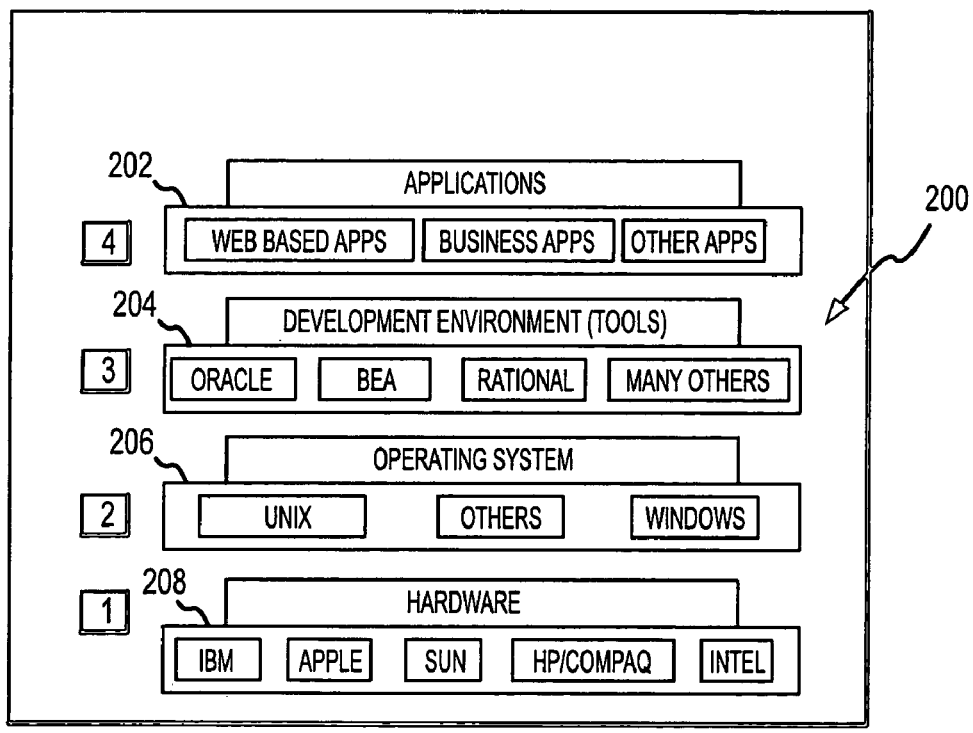
FIG. 2 illustrates examples of proprietary applications at various layers of the application development environment.

Operating system software and development tools have historically been sold by competing commercial vendors and the software is proprietary. FIG. 2 illustrates a proprietary software development environment 200 with examples of proprietary products at each layer. As shown, the application layer 202 includes various commercially available web-based applications, business applications and other applications. At the development environment tool layer 204, commercially available tools are provided by Oracle, BEA, Rational and others. The dominant systems at the operating system layer 206 are Windows and Unix, though others are available. Examples of manufacturers at the hardware layer 208 include IBM, Apple, Sun, HP/Compact and Intel.

It will be appreciated that there is generally limited flexibility relating to integrating stacks for the software development environment. More specifically, existing operating systems provide an open platform by which particular products can operate independent of the specific hardware environment to a significant degree. Moreover, many products can operate across multiple operating systems. However, at the application layer 202 and development environment tool layer 204, options are much more limited. Some commercial software developers provide integrated stacks of multiple proprietary products or provide individual products that can be readily integrated into a stack. Similarly, integrated open source stacks or coordinated open source projects are provided by some software developments. These products are developed much like the corresponding proprietary products but have open source rather than proprietary license associations. However, these commercial developers generally have little incentive to accommodate interoperation with respect to products of competing commercial developers. Accordingly, such stacks may be limited to products of a particular commercial developer or a developer and industry partners. Accordingly, an end user has limited flexibility and may be locked into an overall stack environment due to a need for a particular product.

Figure 3:
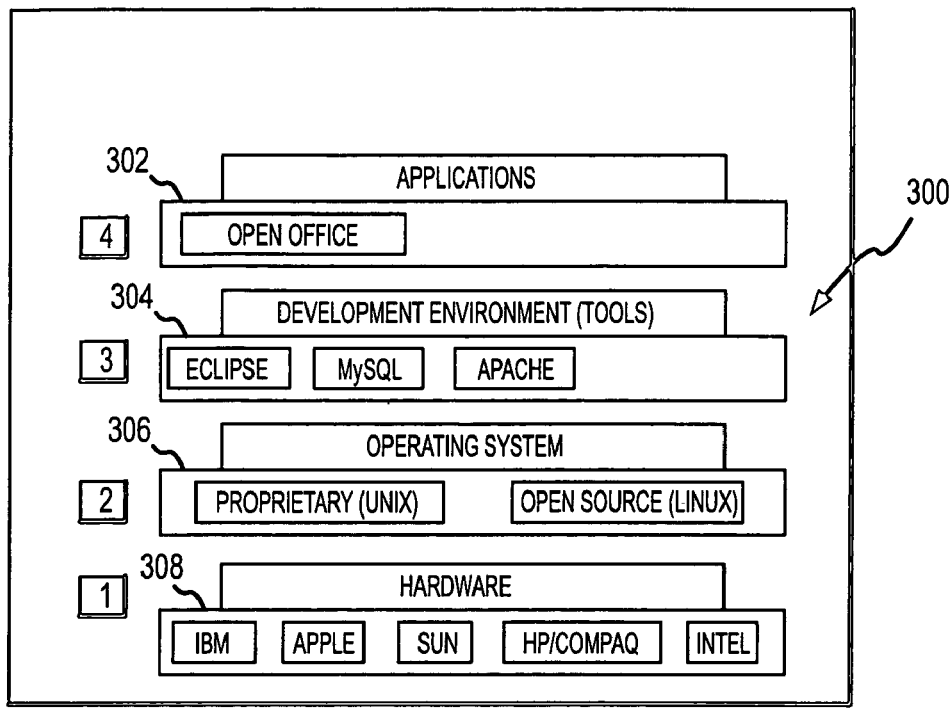
FIG. 3 illustrates the layers of an application development environment including open source options.

Open source software, particularly Linux, has become widely adopted for the operating system layer. In addition, open source development tools and applications are emerging. FIG. 3 illustrates an open source application development environment 300. That is, the open source application development environment 300 includes at least one open source project at the application layer 302 and/or development environment tool layer 304. Proprietary applications may also be available and utilized at these layers in the environment 300. As shown, an example of an open source application at the application layer 302 is OpenOffice. At the development environment tool layer 304, examples of open source tools include Eclipse, MySQL and Apache. The illustrated environment 300 includes, at the operating system layer 306, one example of an open source operating system (Linux) and one example of a proprietary operating system (Unix). At the hardware layer 308, a number of proprietary original equipment manufacturers are identified. It will thus be appreciated that a full open source application development environment may include or allow for or allow for proprietary elements, at the operating system and hardware layers 306 and 308 and at the development environment and application layers 302 and 304.

Figure 4:
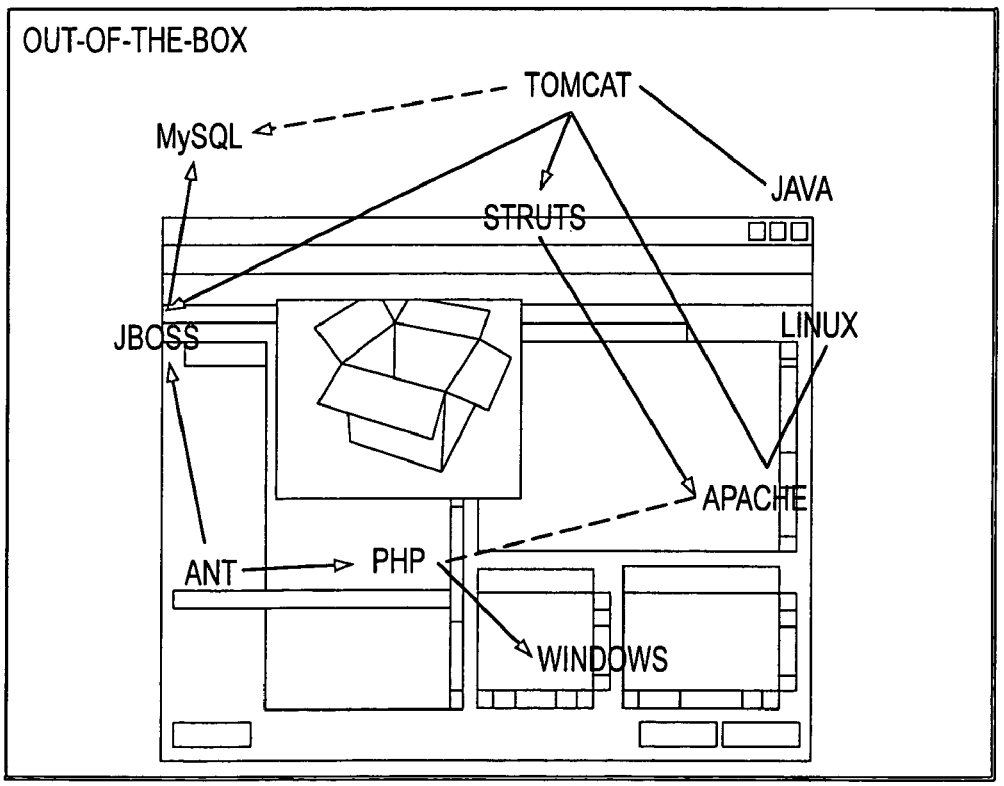
FIG. 4 illustrates certain dependency relationships of projects in an application development environment.

As noted above, while many high quality open source projects are available, there are a number of difficulties associated with the stacking of multiple open source projects (alone or together with proprietary products) to enable a full application development environment. This is graphically illustrated in FIG. 4. FIG. 4 illustrates a number of open source projects and proprietary products. The lines and arrow connecting the various components represent mandatory and conditional dependency relationships such as prerequisites and projects that may be used by another project once installed. A thorough understanding of these dependency relationships as well as a machine state is often necessary to assemble an appropriate stack for a particular endeavor.

Moreover, considerable expertise and time may be required for installation of a stack once assembled. For example, installation issues may involve determining a proper installation sequence, addressing various hardware issues, resolving conflicts and testing an installed stack, for example, to determine that required files are accessible. Post-installation issues involve providing appropriate training tools and documentation as well as facilitating the installation and modification of particular projects as well as stacks. These issues are addressed by a system according to the present invention as described below.

II. System Architecture

Figure 5:
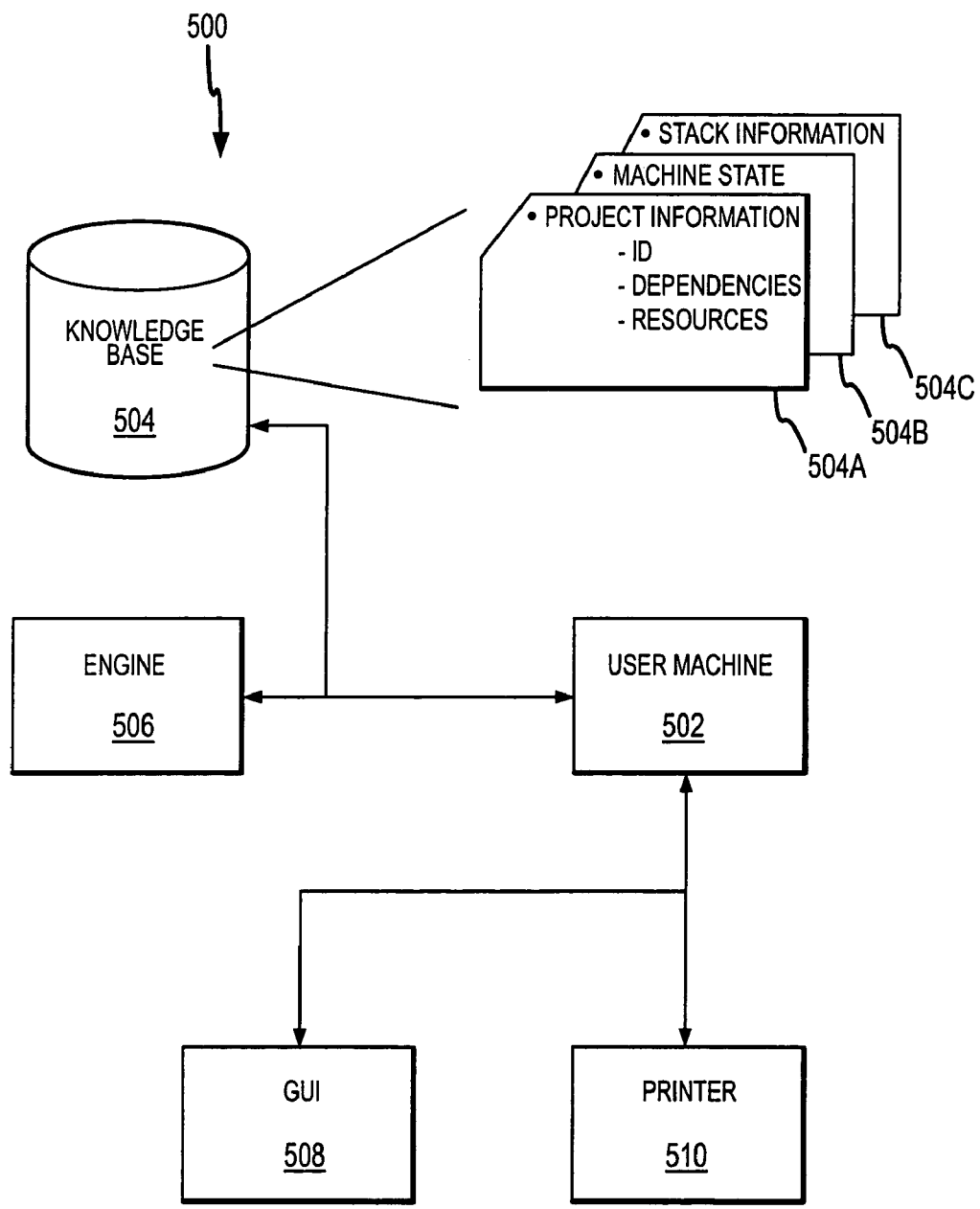
FIG. 5 is a schematic diagram of a software stack assembly, installation and support system in accordance with the present invention.

FIG. 5 illustrates a software stack assembly, installation and support system 500 in accordance with the present invention. The system 500 is operative to allow a user, operating a user machine 502 such as a personal computer or other processor or processing network, to identify open source (and/or other) software projects for assembly into a stack, to integrate the projects and install them on the user machine 502, and to generate documentation and training materials specifically related to the stack. The system 500 provides certain additional functionality, such as switching databases or other tools within the stack, e.g., to achieve optimized performance for a particular endeavor. It will be appreciated that such functionality generally is not supported within proprietary or other coordinated software contexts, where the integrating entity usually has a vested interest in commercializing particular software products, nor is such functionality supported within current uncoordinated open source contexts, where stack assembly, integration and installation has generally been performed on a customized endeavor-by-endeavor basis.

The illustrated system 500 includes a knowledge base 504 that stores and provides knowledge required for the noted open source stack functionality and an engine 506 that provides the logic for executing such functionality. The knowledge base 504 and engine 506 may be resident on the user machine 502, or may be at least partially accessible to the user machine 502 via a network such as a WAN, e.g., the internet. Moreover, the knowledge base 504 and engine 506 may be resident on a single processing platform, or a distributed architecture may be employed.

The illustrated knowledge base 504 includes, for each supported project, project information 504A such as identification information and legal information, operational information, and category information. The knowledge base also includes certain machine state information 504B regarding the user machine 502. In addition, the knowledge base includes certain stack information 504C for use in executing functionality at the stack level, such as testing information.

With regard to project information 504A, the information that may be included in the knowledge base 504 to identify a given project may include the project name, version, type, home URL, categories, description (with comparisons and recommendations) and links to full project details. The legal information will generally include any licenses with full license text or links thereto. Such license information provides important legal information to users and further supports license filter functionality as described below. The projects may be stored locally or downloaded or otherwise accessed at the time of installation.

The operational information may include dependency relationship information and other resource information. For example, the dependency relationship information may include a list of prerequisites for each project, along with a description of why that dependency exists and how the dependent project is used. The dependency relationship information may further include a list of other projects that use each project, together with a description of why that dependency exists and how the dependent project is used. As will be understood from the description below, such information is used to properly assemble stacks as well as to provide stack explanation information to the user. In addition to dependency relationship information, the operational information may include other resource information such as ports used.

The category information allows for sorting and filtering of projects. For example, the categories utilized may include:
Client
Database
Documentation
Internet
J2EE
Programming
Sample
Security
Server
Source Code Management
Testing
XML In this manner, users can conveniently access desired project information.

The machine state information 504B may include updated information regarding projects and other resources that are available or unavailable on the user machine 502. For example, if a particular tool such as a database has previously been installed, this may be stored in the knowledge base 504 and taken into account in addressing dependencies and assembling stacks so as to avoid conflicts that might otherwise occur. Similarly, port usage and other resource issues may be accounted for so as to facilitate integration and proper interoperation of installed projects.

The illustrated knowledge base 504 further includes stack information 504C. Certain information may be indexed to stack combinations rather than to individual projects. For example, information corresponding to project information described above may be stored for common stacks. In addition, certain installation information such as testing parameters may be defined in relation to stack combinations.

The knowledge base 504 may store various other kinds of information not shown such as operating environment information. For example, information may be stored to support installation for multiple operating systems and to associate particular uses of projects or stacks with particular operating systems. For example, it may be desired to develop on Windows and deploy on Linux.

The engine 506 accesses the knowledge base 504 at run time to obtain all necessary information and executes logic for stack assembly, installation and post-installation support as described in detail below. The user can use the graphical user interface 508 to receive prompts and other information to assist in implementing this functionality and to enter associated information. The printer 510 allows for generating hardcopy documentation.

It will be appreciated that the illustrated architecture allows for convenient system implementation and maintenance. In particular, projects or other information can be added or modified simply by updating the knowledge base 504 substantially without updating the engine 506 or other system components. Moreover, the engine 506 allows for rendering of interfaces with a consistent look and feel across operating systems or other implementation variations.

III. System Functionality

As noted above, a system in accordance with the present invention may provide open source stack functionality related to assembly, installation and post-installation support.

A. Assembly

Stack assembly generally relates to identifying a number of open source and/or other projects to form a stack for addressing a particular endeavor. In this regard, the system of the present invention can be used to perform a number of functions. For example, information regarding particular projects can be accessed in order to obtain a description of the projects as well as dependency information. In addition, information regarding stacks for common types of endeavors, such as electronic commerce web site design, can be accessed. In this manner, software developers who may have limited knowledge of available open source and other resources may quickly assemble stacks. The system is also fully functional to access machine state information, project information and stack information such that the engine can be used to address dependency relationships and facilitate stack assembly as described below.

Figure 6:
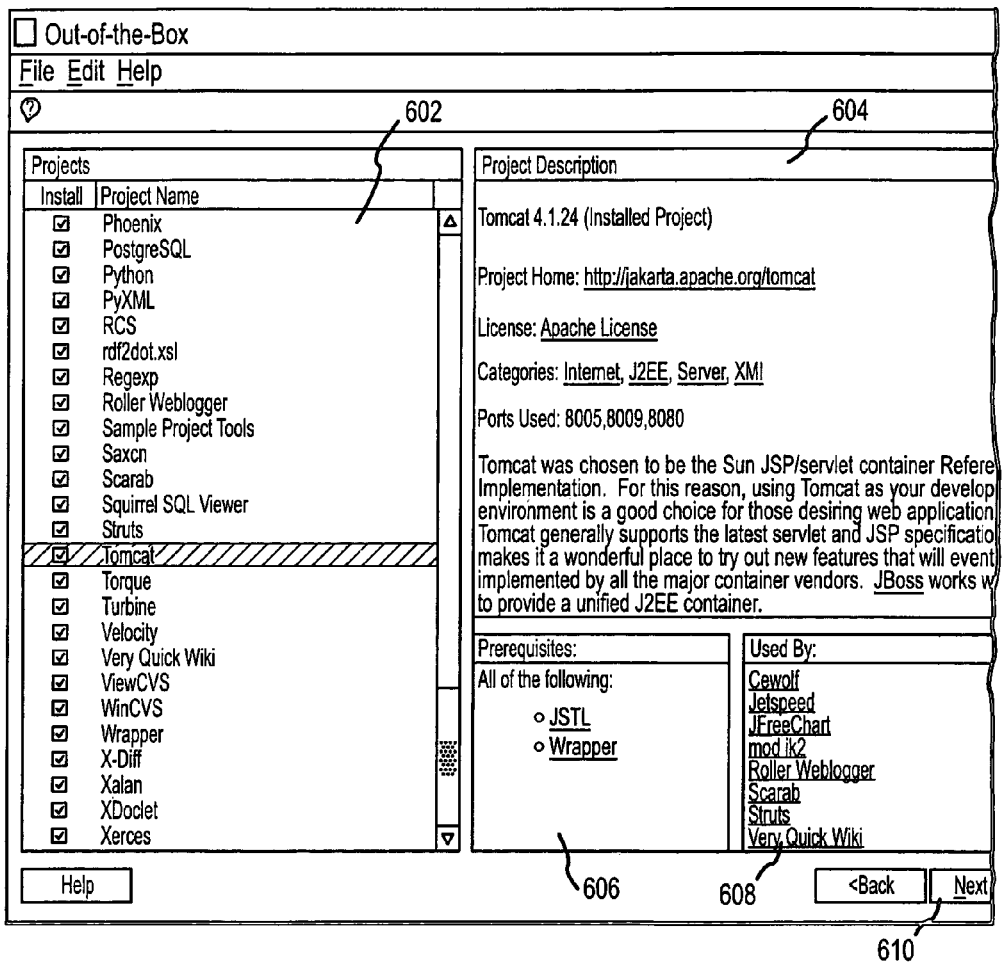
FIGS. 6-11 are examples of user interface screens that may be provided in connection with operation of the system of FIG. 5.

Referring to FIG. 6, a user interface screen 600 that may be utilized in connection with stack assembly is shown. As illustrated, the user interface 600 includes a project identification panel 602, a project description panel 604, a prerequisite panel 606 and a used-by panel 608. Generally, the project identification panel 602 displays a list of supported projects with highlighting, graying and other graphical elements to indicate status and certain dependency information as will be described below. The project description panel 604 includes certain project identification and description information as shown, including recommendations and other assistance for the project highlighted in panel 602. The prerequisites panel 606 identifies projects that are prerequisites of the identified project and the used-by panel 608 identifies other projects that may use the highlighted project.

More specifically, in the panel 602, primary projects are shown in bold. Dependent projects are shown in normal typeface. Mandatory projects are checked and cannot be changed. When a project is highlighted in the panel 602, information relating to that project, in this case Tomcat, is provided in panels 604, 606 and 608. In the illustrated example, the title and version of the project is identified at the top of panel 604 together with information in parentheses indicating whether it is, for example, a mandatory project or installed project. A link to the project home URL is then provided followed by a link to view the project license. Also shown are categories associated with the project that can be used for grouping or filtering the projects and an identification of the ports used by the project. Finally, a description of the project is provided including, in some cases, recommendations or tips relating to the project.

The used-by panel 608 lists other projects that depend on the highlighted project. Conversely, the prerequisites panel 606 shows other projects that are required in order to install the highlighted project. It will thus be appreciated that the panels 606 and 608 collectively define the dependency relationships for the subject project.

This dependency relationship information is derived from the knowledge base and is used by the engine to provide assistance in graphical form related to stack assembly. In this regard, if the user selects a project in panel 602 by checking its associated install box, and that project has a prerequisite that can be fulfilled by two or more other projects, or if there is an unchecked dependency, an indication (e.g., audio or visual) may be provided to prompt the user to resolve such issues. In this regard, the project name turns red in the illustrated implementation and the user is unable to continue with stack assembly until the dependency is resolved. For example, if the project JBoss is selected in panel 602, the JBoss lettering may turn red to indicate that a prerequisite is required. The user can then consult the prerequisites panel 606 which, in this case, would indicate that JBoss needs either MySQL or PostgreSQL to continue. In the illustrated implementation, the "Next" button on the GUI is disabled until the dependency issues have been resolved, thus ensuring that the user does not continue until all requirements are met. In other cases, dependencies may be selected automatically.

In the noted example, the user may then elect to select MySQL to satisfy the JBoss dependency. Once the selection is made, the JBoss project will no longer be listed in red thereby indicating that the dependency has been satisfied and stack assembly and installation may proceed. As noted above, a project type is listed in parentheses next to the project name and version at the top of panel 604. The types of projects include mandatory, dependent, primary or already installed. The project type is a link and if clicked will give a description of each of the project types. Similarly, the license identification is a link which, if clicked, presents the full text of the license in panel 604. The categories associated with each project are also links. If these links are clicked, other projects in the category are listed in the panel 604. For example, if the category "server" is clicked, the panel 604 is filled with a project description box with an initial description such as Tools usually found on servers or developer workstations.
Not typically intended for end users.

followed by a listing including ANTLR, Apache, Http Server, etc. Projects listed in this description are links which, if selected, provide a more detailed description of the selected project. In this regard, links may be provided throughout the text, for example, when a supported project is listed in the description of another project.

Once a project has been installed, the next time the user runs the system the installed projects are shaded in panel 602 and are no longer selectable.

A button (not shown) is also provided in the tool bar to toggle between install and uninstall modes. If this button is selected, for example, to switch from the install mode to the uninstallation mode, a pop-up box will appear warning that selected projects will not be installed and confirming that this is what the user intends. Once this intention is confirmed by the user, the system enters the uninstall mode. In this mode, the projects that are installed are shown in the project list of panel 602. Again, primary projects are shown in bold and dependent projects are shown in regular typeface.

By way of example, in the install mode, the user may select AspectJ, Castor, Eclipse and Eclipse plug-ins for installation. It may be noted in this regard that if the Eclipse plug-in is first selected, the Eclipse project will be automatically selected. Once all of the desired projects have been selected, the user may select the next button 610 to proceed. If any of the selected projects require more information to be properly installed, a project properties page will be shown to collect this information. A further user interface screen may be provided, if desired, between the noted project selection and project properties screens to check the ports (and potentially other resource requirements) to make sure the machine state is compatible with the selected projects. If the selected project requirements are not met, the user will be instructed as to how to correct them. In some cases, any problems in this regard can be corrected automatically. In any case, installation can be deterred until all requirements have been met, thereby avoiding potential installation complications. The user can choose to go backward and change project selections as one way to resolve any issues.

Figure 7:
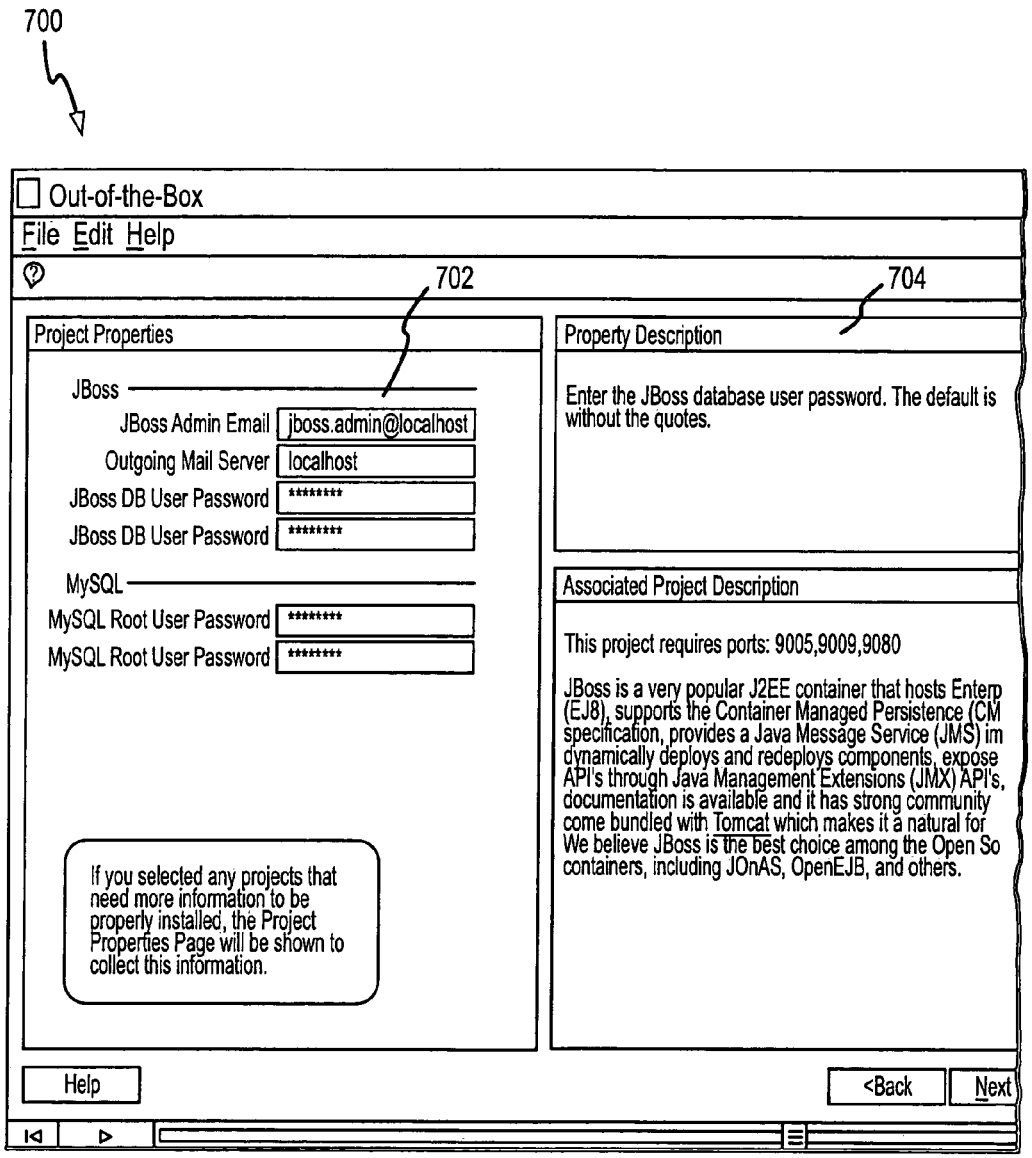
Figure 8:
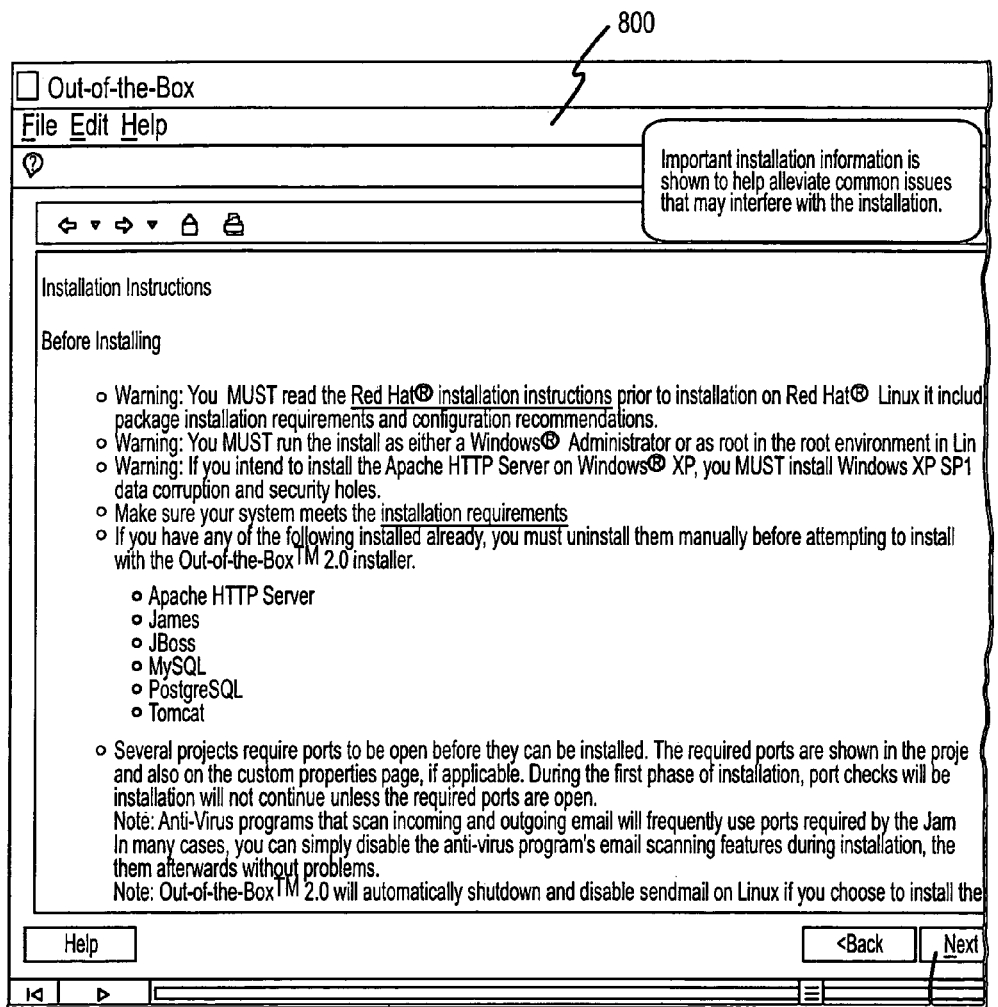

An example is shown in FIG. 7. In this case, the user is prompted to enter and re-enter passwords for JBoss and MySQL in the project properties panel 702. A description of the selected properties is given in panel 704 to assist the user in entering the correct information. Once all necessary installation information has been entered, an installation instruction screen 800 as shown in FIG. 8 is displayed. This screen provides information to alleviate common issues that may interfere with the installation. Links may be provided in this screen 800 to obtain any additional instructions and requirements that may be useful.

Figure 9:
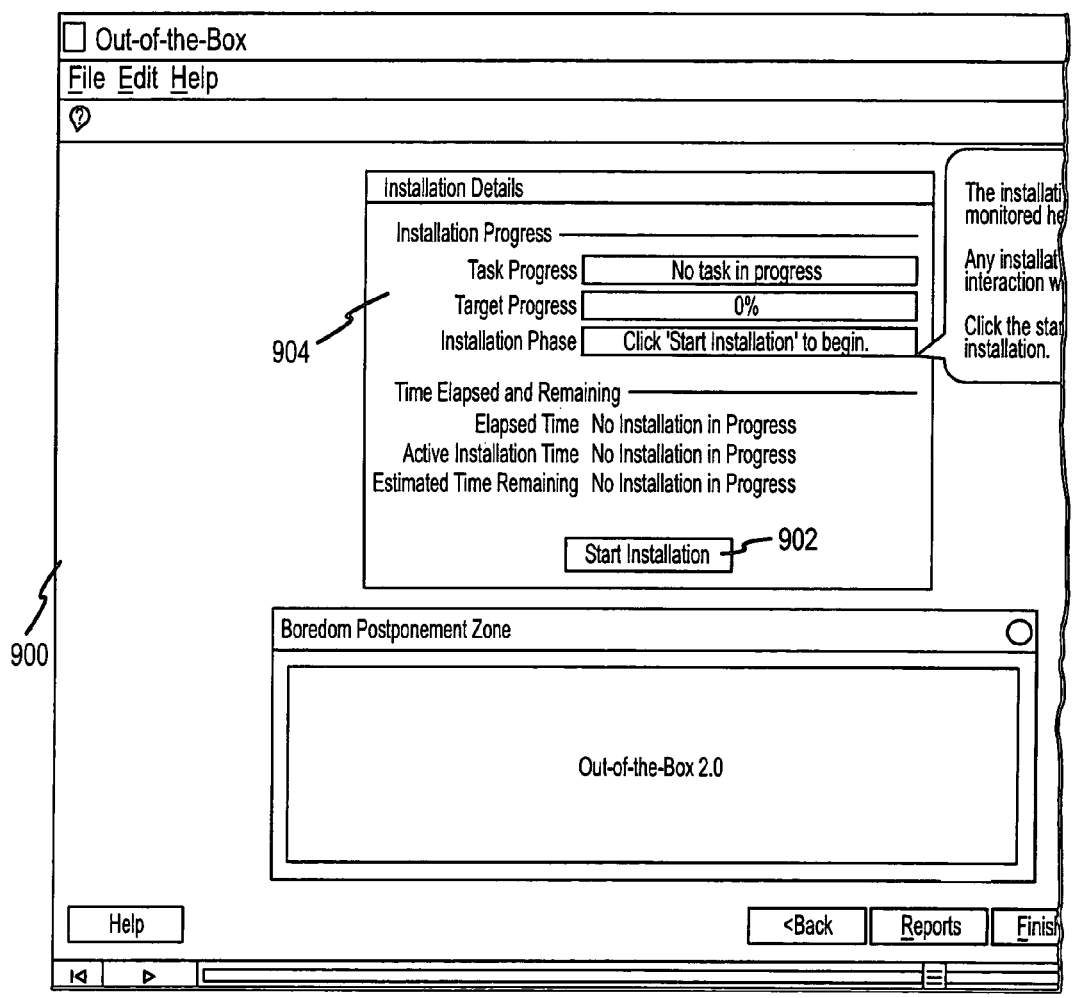
Figure 10:
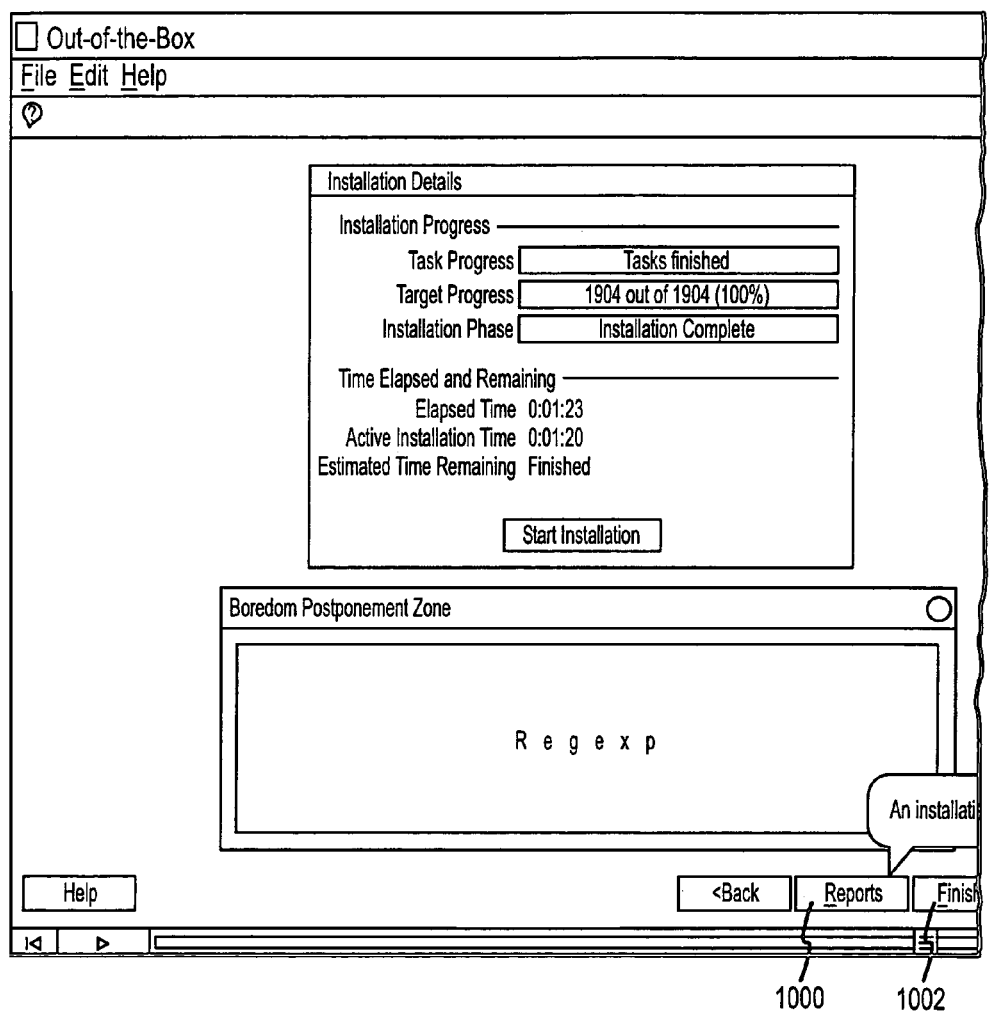
Figure 11:
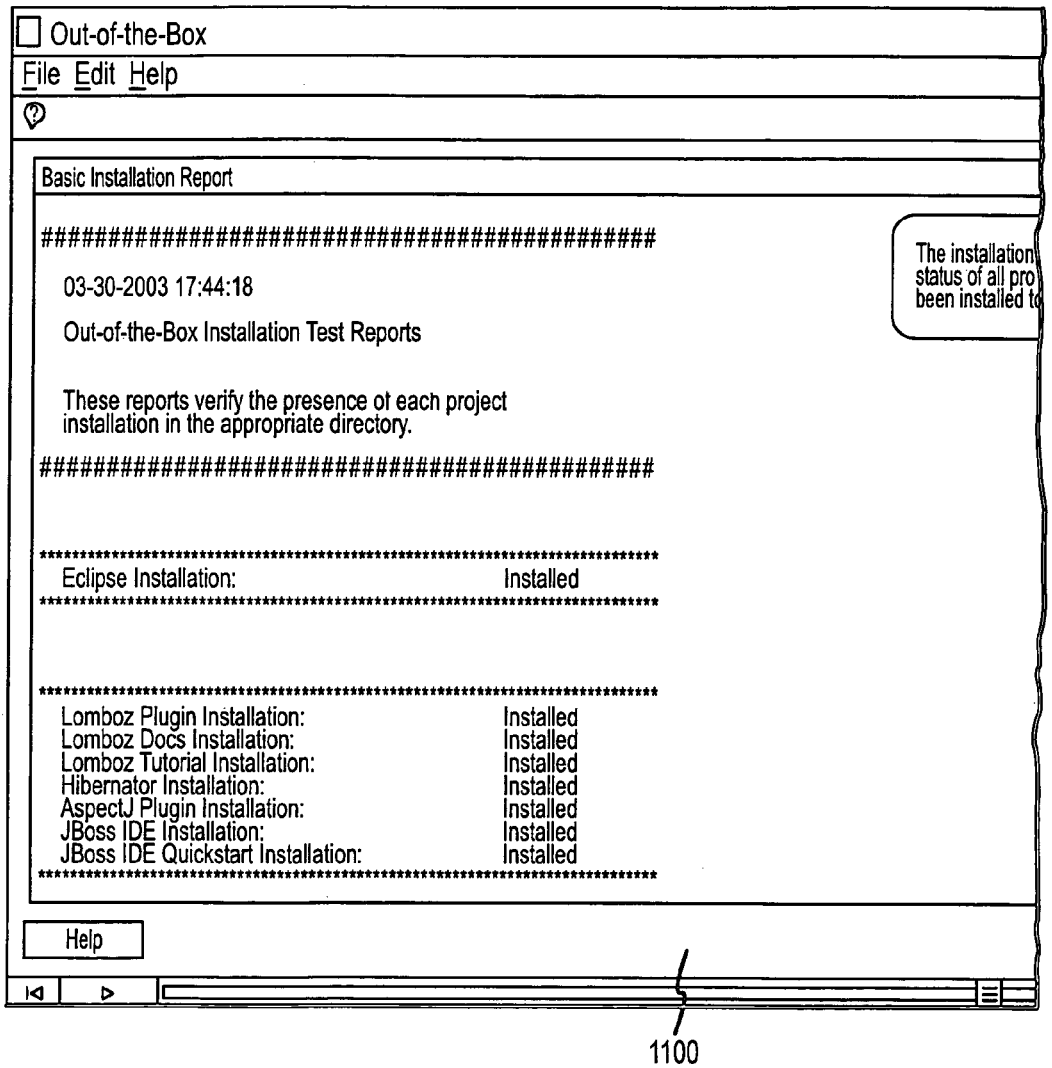

When the user is finished with the installation instruction screen 800, the user can select the next button 802 to go to the installation screen 900 as shown in FIG. 9. From the screen 900 the user can select the start installation button 902 to initiate installation. The progress of the installation can be monitored in Window 904. A pop-up window indicates when the installation has been successfully completed and provides information regarding post-installation instructions. As shown in FIG. 10, upon completion of installation, the user is able to select a reports button 1000 to generate installation reports or select the finish button 1002 to complete the installation process. An example of an installation report is shown is shown in FIG. 11. Specifically, the report 1100 shows the status of all projects that have been installed at the time of the report.

The projects that may be installed in this manner may include, for example:

| | |
|---|---|
| Ant | JFreeChart |
| ANTLR | JMeter |
| Apache Server | JSTL |
| AspectJ | JUnit |
| AspectJ sample application | jWebUnit |
| Avalon Phoenix | Log4j |
| BCEL | Lucene |
| BeanShell | Maven |
| BSF | Maven Developer sample application |
| Cactus | Maven Multi-Project sample application |
| Castor | Maven Server sample application |
| Castor sample application | Middlegen |
| CeWolf | Middlegen/XDoclet/Jbox/Struts sample application |
| cglib | MinGW |
| CheckStyle | MSYS |

-continued

| | |
|---|---|
| Commons | mod_jk2 |
| CVS | MyFaces |
| CVSGraph | MySQL |
| CWM | MySQL Connector/J |
| DB2 | NetBeans |
| DbUnit | OpenSSH |
| Display Tag | Oracle |
| DocBook | Oro |
| DocBook-XSL | PHP |
| dom4j | phpBB |
| Eclipse | phpMyAdmin |
| Eclipse Plugin: AspectJ Development Tools | PostgreSQL |
| Eclipse Plugin: CDT | PuTTY |
| Eclipse Plugin: CSS Editor | Python |
| Eclipse Plugin: JBoss-IDE | PyXML |
| EJB Benchmark | rdf2dot.xs1 |
| Enscript | Regexp |
| blueglue Existing Server Compatibility | Roller Weblogger |
| External MySQL Integration | Saxon |
| External PostgreSQL | Scarab |
| FOP | SiteMesh |
| Fulcrum | Spring |
| Graphvis | blueglue Sample: Spring-JSF |
| Hibernate | blueglue Sample: Spring-Struts |
| Hibernate/AspectJ sample application | blueglue Sample: Spring-Tapestry |
| Hibernate/JBoss/AspectJ sample application | blueglue Sample: Spring-Web Work |
| Hibernate/Middlegen sample application | blueglue Sample: SpringMVC |
| Hibernate/XDoclet sample application | Squirrel SQL Viewer |
| HSQLDB | Struts |
| HttpUnit | StrutsTestCase |
| JAF | SuSE |
| JAI | Tiles |
| James | Tapestry |
| JavaGroups | Tomcat |
| JavaHelp | Torque |
| JavaMail | Turbine |
| Javassist | Velocity |
| Java Service Wrapper | Very Quick Wiki |
| Jaxen | ViewCVS |
| JBoss | Web Work |
| JCS | WinCVS |
| JDepend | XalanX-Diff |
| JDK | X-Diff |
| JDOM | XDoclet |
| jEdit | Xerces |
| Jelly | |
| Jetspeed | |

It is noted that this exemplary listing includes open source projects as well as at least one proprietary application. Other open source projects and proprietary applications may, of course, be supported.

The GUI may also execute a filter function to selectively enable or inhibit access to particular projects by individual users, e.g., within a client entity. For example, a company may configure the system to assist in implementing a policy regarding, for example, what projects may be accessed, how such projects may be used, and by whom. In this regard, a company may define such projects on a project-by-project basis or by type; may specify a set of projects that may be used internally, the same or a different set of projects that may be incorporated into products (generally or on a product-by-product basis), and other project sets for other purposes; and/or may specify what projects may be accessed by an individual or a set or sets of individuals e.g., by software developers, by IT personnel, by accounting, etc.

It will be appreciated that the filter, the underlying policies and the associated filter parameters are selected by and are the responsibility of the client entity. The filter provides a convenient tool for implementing and improving internal enforcement of such policies after the policies have been devised by the client entity with such consideration of the legal environment and other factors as deemed appropriate by the client entity. It is not intended that the filter be used as a substitute for full consideration of such issues or in lieu a full internal education and enforcement regime.

As noted above, a variety of parameters may be used to configure the filter. One such parameter is license type. In the context of open source projects, there are currently over 45 different recognized open source licenses. These include, for example, the General Public License (GPL), Lesser General Public License (LGPL), BSD, and Apache licenses. Open source licenses are not free of restrictions and obligations and different licenses involve different restrictions and obligations in this regard. While these restrictions and obligations are not always unambiguous, and the specific license terms should be consulted with due care, certain characterizations are possible. For example, certain licenses require that the source code of software, including proprietary software, distributed with the licensed open source software be made publicly available. Such licenses generally include obligations with respect to copyright notices and attributions with respect to copies of the software. Client entities will therefore generally need to carefully consider such licenses in relation to intended uses as part of a compliance program.

These licenses may serve as a parameter of the noted filter. That is, as noted above, license information is associated with each supported project in the illustrated system. These license designations may be selected or deselected by the client entity or system operator, e.g. using a filter graphical user interface, to enable or disable access to projects based on license or license type. Such configuration may be executed for specific users, user groups, intended uses, etc. Upon definition of such a filter or filters, the GUI is operative to inhibit or facilitate access to projects, generally in accordance with the selected filter parameters.

The filter is not necessarily limited to binary allow or disallow functionality. For example, three or more filter levels may be defined such as "red", "yellow" and "green" levels that may correspond levels of license restrictions or obligations. Thus, a particular client entity might decide, in its own discretion and in accordance with its own internal policy, that GPL licensed projects will be associated with the yellow filter level and BSD and Apache will be associated with the green filter level.

The GUI can then be configured to execute different filter functionality in connection with each filter level. For example, "red" projects may be excluded from the project identification panel 602 (FIG. 6) or selection thereof may be disabled. In the case of yellow projects, appropriate warnings regarding use or restrictions on use (e.g., "Internal Use Only" or "please consult with compliance officer prior to use") may be displayed, or a password or other authorization may be required to complete installation. Green projects may be accessed as described above free from filter inhibitions. It will be appreciated that other filter levels and associated filter functionality is possible in accordance with the present invention. While such automated filtering may be imperfect in matching and executing policy goals and is no substitute for full education and compliance program, it provides a useful mechanism for encouraging adherence to a compliance program which has become a great concern for companies considering use of open source and other projects.

It is noted that such filter functionality may have considerable value apart from the illustrated system. For example, the filter may be used by a compliance officer, wholly independent of any stack assembly, installation and support functionality, to screen projects proposed for use by employees. Moreover, such a filter may be implemented in connection with an Internet gateway filter (e.g., otherwise used to limit internet access in accordance with company policy) to inhibit downloading of designated projects, for example, based on associated URLs. Other execution environments and uses of the filter are possible in accordance with the present invention.

Figure 12:
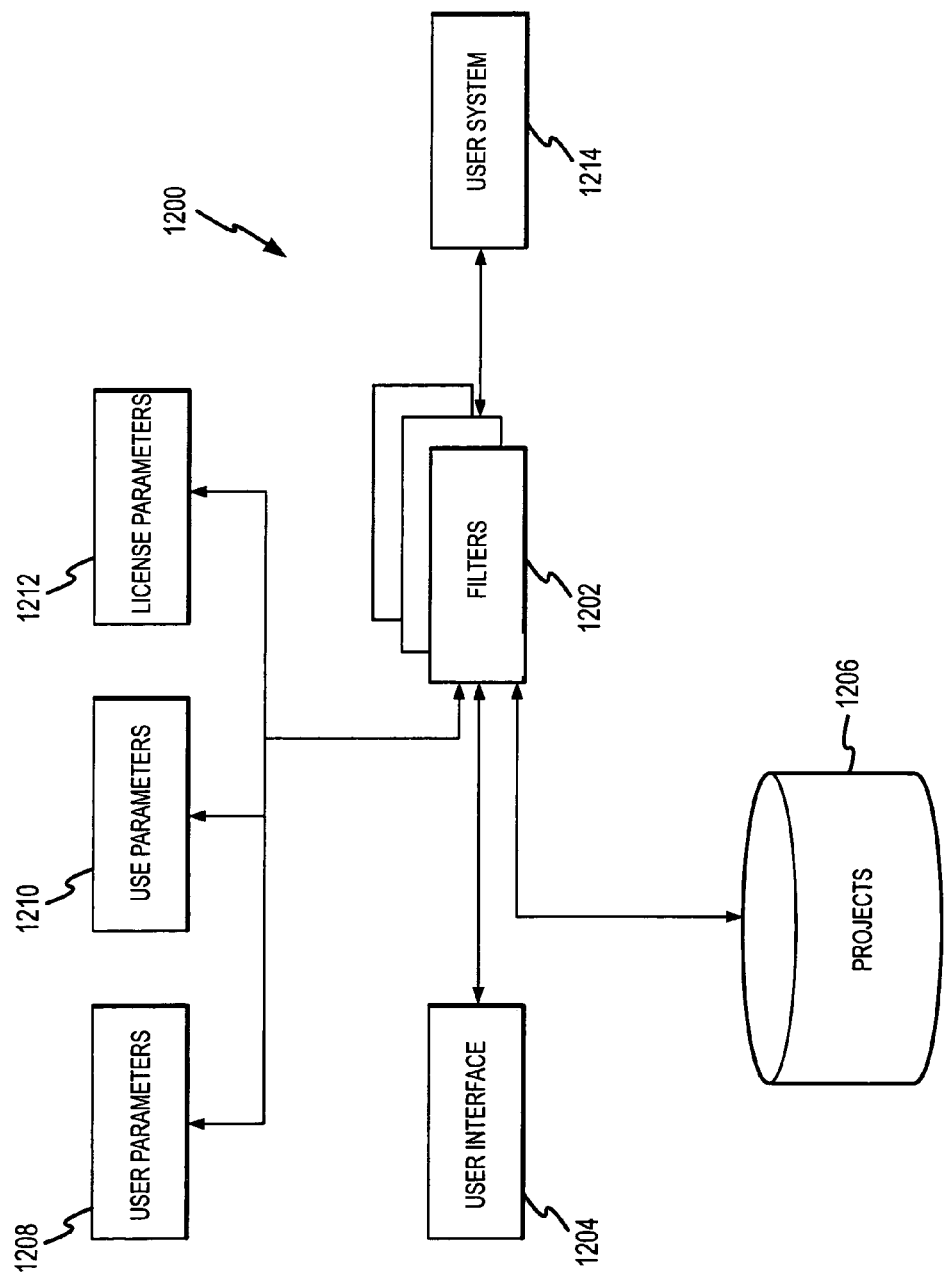
FIG. 12 is a schematic diagram illustrating a project filter system in accordance with the present invention.

FIG. 12 is schematic diagram illustrating a filter system 1200 in accordance with the present invention. The illustrated system 1200 includes logic for executing one or more filters 1202. For example, different filters 1202 may be defined for different users or user groups within a client entity.

The filters 1202 may be defined by a user by way of user interface of 1204. In this regard, filter identification information, filter parameters and the like may be entered by way of a template or a series of menus displayed on the user interface 1204. In this manner, the user can define a number of filter parameters such as user parameters 1208, use parameters 1210 and license parameters 1212. The user parameters 1208 may identify specific users or user groups, e.g., application developers, IT personnel, accounting, etc. The use parameters 1210 define the intended or allowable uses. Thus, for example, it may be desired to allow one set of projects for internal uses and a second (typically more limited) set of projects to be incorporated into products. The license parameters 1212 allow for controlling access or use of projects based on license associations. Thus, as noted above, certain licenses may be associated with a green filter level, others may associated with a yellow filter level and still others may be associated with red filter level. Appropriate filter rules may be defined for each of these filter levels.

Based on such filter configuration information, the filters 1202 selectively allow access to or use of projects 1206 by a user system 1214. For example, the filters 1202 may inhibit access to selective ones of the projects 1206, may prevent installation of selected ones of the projects 1206, or may provide certain warnings or require certain authorizations in connection with access to or use of individual ones of the projects 1206. Such filtering functionality may be executed in response to an identification of the user system 1214, a user I.D. entered via user system 1214 or otherwise, or an intended use entered by the user. The projects 1206 may be defined by a list of supported projects of a stack assembly, installation and support system as described above, a listing of projects defined by a compliance policy of a client entity, or projects that are identified on a case by case basis, for example, in connection with a request to download a project via the internet.

Figure 13:
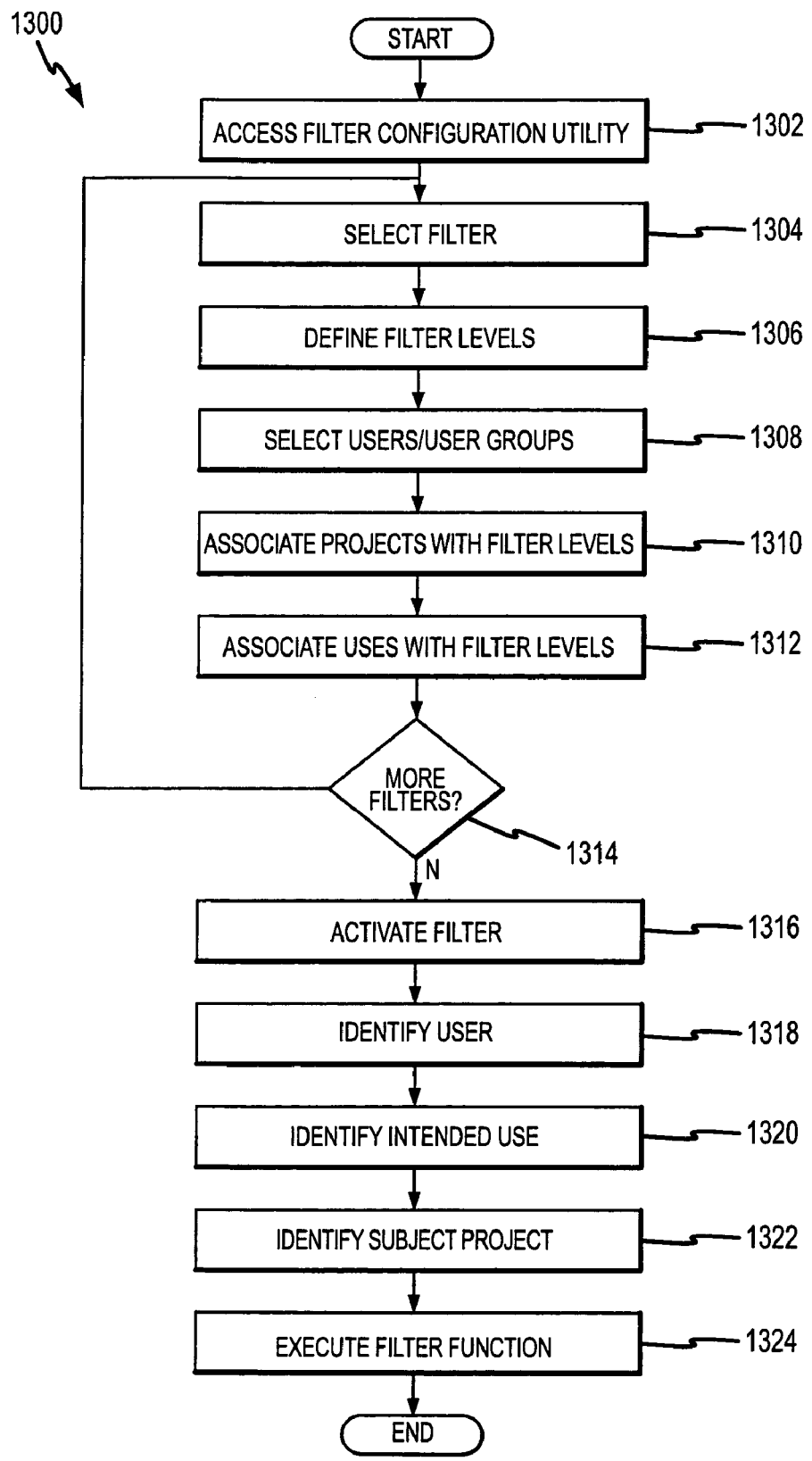
FIG. 13 is a flow chart illustrating the operation of the project filter system of FIG. 12.

FIG. 13 is a flow chart illustrating a process 1300 for configuring and operating a project filter in accordance with the present invention. The illustrated process 13.00 is initiated by accessing (1302) a filter configuration utility. Such configuration may be implemented by a client entity, a system provider, or other operator. Using the utility, a filter is selected (1304). This may involve associating a filter identification with a particular filter to be configured. In this regard, it will be noted that a client entity, a system provider or other operator may define and manage multiple licenses.

Once the filter is selected, filter levels may be defined (1306) for that filter. As noted above, a filter may be a binary in this regard or may include more than two filter levels. Thus, a binary filter may be operative to selectively allow or disallow access to specific projects by specific users for specific purposes. A filter with more than two filter levels may allow access, disallow access or allow access with certain restrictions or authorizations. Individual users or user groups may then be selected (1308) for association with the defined license. This allows for different levels of access to particular projects or project groups (e.g., defined by an associated license type) on an individual user basis or by a user group such as an applications development group.

The illustrated process 1300 involves associating (1310) projects with the defined filter levels. Again, this may be done on a project-by-project basis or by groups of projects, e.g., as grouped based on license type or another category such as noted above. It will be appreciated that other filter parameters may be defined in this regard such as, for example, expiration dates and copying or distribution parameters. Once all desired filter parameters have been defined, it is determined whether additional filters need to be defined (1314). If additional filters are to be defined, this process is repeated. Otherwise, the filter is activated (1316) for use in the desired project filter environment.

In use, the filter is operated to identify (1318) a user for a given filter function. The user may be identified based on user identification information entered by the user or based on the identity of the user machine or system. An intended use may also be identified (1320). The intended use may be entered by the user or may be inferred from a user group or other information. In this regard, it will be appreciated that the filter may be operative to a prompt user to enter such information as a gateway function prior to accessing a stack assembly, installation, de-installation and/or support functions. In addition, the subject project is identified (1322). Depending on the specific implementation, such identification may be responsive to a request, such as an installation request, entered by the user or may be performed independent of any user input, in the background or prior to running of the stack assembly, installation and/or support function. In this regard, the filter may operate to prevent display of a filtered project or to prevent selection of a filtered project independent of any input by user. Finally, the filter is operative to execute (1324) the filter function. Such execution may involve selectively allowing access to an identified set of projects, selectively disallowing access to or particular uses of an identified set of projects, or display of limitation information/require appropriate authorizations.

Figure 15:
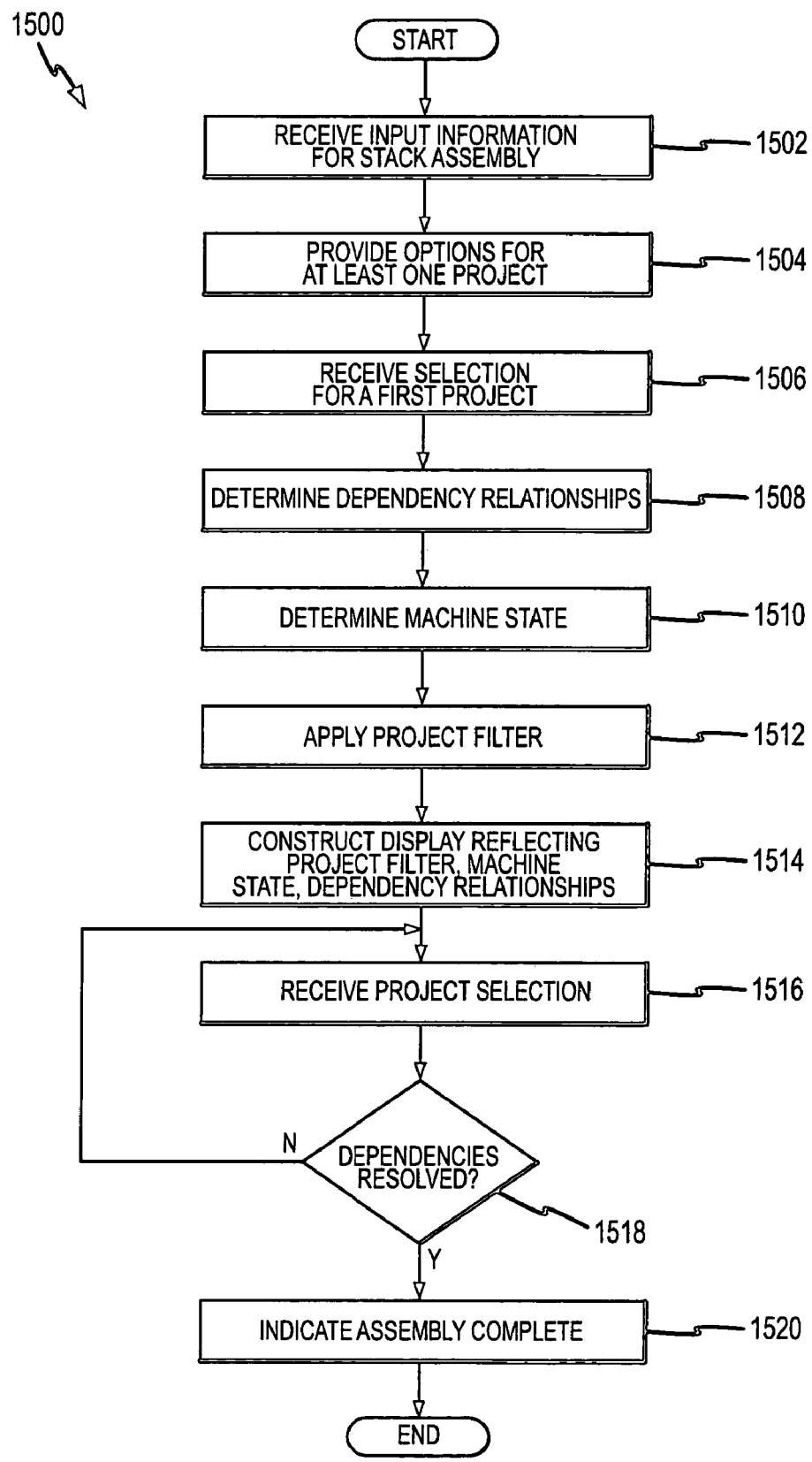
FIG. 15 is a flow chart illustrating a stack assembly process in accordance with the present invention.

An exemplary installation process 1500 is shown in FIG. 15. The illustrated process is initiated by receiving (1502) input information for a stack assembly. It will be appreciated that the process may be initiated in a variety of ways. For example, some users may know that they are interested in assembling a package that includes a particular project that is relevant to a given endeavor. In this case, such users may simply identify that project, for example, by scrolling through a list of supported projects or by using a search function, and then work through dependency relationships as discussed above. In other cases, users may know the name of a proprietary application and may be interested in identifying an open source analog. In such cases, a tool may be provided for identifying such association. In still other cases, a user may not know the name of a project but may only know the function of interest. In these cases, assistance may be provided in the form of graphical user interfaces to assist the user in initiating the installation process. For example, menus may be provided, such as pull-down menus, whereby the user can identify a function of interest. Additionally or alternatively, supported projects may be graphically illustrated, for example, with links to project descriptive information, to assist a user in identifying a project of interest. As a further alternative, the process may be initiated with an interview process over a number of interfaces to identify user needs. It will be appreciated that a wide variety of interface mechanisms are possible in this regard.

In any event, once input information is thereby received, the illustrated process 1500 involves providing (1504) options for at least one project. Thus, for example, if the input information indicates that the stack of interest relates to web design, a variety of web design project options may be identified. For example, such identification may be accomplished by highlighting or otherwise drawing attention to such projects in a list of supported projects. Alternatively, the relevant projects may simply be listed with links to user interfaces that provide project information as described above. It will be appreciated that in some cases only one project may be available rather than a selection of options.

A selection can then be received (1506) for a first project of a stack under assembly. For example, one project from the noted listing of options may be selected via a graphical user interface. Upon such selection, the system determines (1508) dependency relationships for the project. Such dependency relationships may include, for example, projects on which the selected project depends as well as other projects that are used by the selected project. The system also determines (1510) a machine state. For example, this may involve identifying projects that are already installed on the user's machine. The project filter may also be applied (1512) at this point. Based on all this processing, the system constructs (1514) a display reflecting the project filter, machine state and dependency relationships. Thus, based on the project filter, the set of projects that is available for selection or installation may be limited. Based on machine state, previously installed projects may be identified as installed or may be unavailable for selection to be installed. The dependency relationships may be reflected in various graphical elements and text as described above.

From this display, this system can receive (1516) a project selection. For example, the user may select a project on which the first project depends. After such selection, the system can determine (1518) whether all dependencies are resolved. If the dependencies are not resolved, the user may be prompted to make further project selections. Otherwise, the system indicates (1520) that assembly is complete. Such an indication may be provided by way of a pop-up box or other active display element, or may simply be provided by way of the absence of any remaining dependencies (for example, the first project listing may switch from red to black).

It should be appreciated that the system of the present invention may be used simply to assemble a stack without actually effecting installation and that is an important aspect of the present invention. For example, a developer may use logic resident on the developer's system or access a website to execute the functionality described above in order to facilitate the process of, for example, addressing dependency relationship issues and filter functions associated with the client entity's licensing compliance program. The individual projects of that stack may then be obtained and installed independent of the system of the present invention. However, the installer of the present invention performs a variety of useful functions in connection with installation as will be described below.

B. Installation

It should be understood that the identification of a set of projects where the dependency relationships are internally satisfied does not mean that installation will be successful and free of problems. It is generally still necessary to resolve conflict issues, integrate projects (e.g., so that a given project is configured to point to the correct database), and to test the installed stack for proper installation and interoperation of the projects. In addition, a particular sequence may be required for installation. In accordance with the present invention, the GUI is operative to execute a variety of functionality in this regard.

One such function is performing pre-installation checks. For example, the GUI may identify and resolve port conflicts. As noted above, the project information associated with individual projects identifies the ports that are utilized by that project. This port information can be compared to identify and resolve conflicts. The system may further perform a check to verify that any files or other resources required by a project are available and to otherwise verify that all environmental requirements for a project are satisfied on the user machine or system.

Another function is control of the actual installation process. In this regard, the engine may obtain the project list for a stack, analyze the dependency relationships and any other necessary project information to determine a suitable sequence for installation and then execute installation in that sequence. Prior to executing this installation, the controller may execute logic to identify any resources that may be required in order to effect the desired installation.

Another function that is executed by the GUI in connection with installation is database integration. In this regard, individual projects may require a particular database and different projects may be associated with different databases. The GUI is operative to integrate the individual projects with the desired databases so that the projects point to the desired database.

After installation and database integration have been performed, tests may be performed on the installed stack to verify proper operation of the installed stack. This is accomplished by causing the stack to run on the user machine and then executing test procedures that are defined for particular projects, combinations of projects or overall stacks. For example, such tests may involve looking for particular files, checking ports, pinging a server, etc. It will be appreciated that the particular tests may be determined empirically or based on acquired expertise to provide a high likelihood of identifying common installation errors.

The installed stack may then be run with selected samples. That is, a tutorial specifically designed for the installed stack may be provided by the GUI. The user can run this tutorial to learn how to use the installed integrated stack. In connection with this stack, the installed stack executes certain samples. This operates to provide sample tests. That is, proper operation of the stack is verified in connection with executing the samples. These tests are similar to the tests described above but touch more layers of the software stack than the earlier tests and operate in an execution environment. If any errors are identified as a result of these tests, error messages may be provided together with information regarding resolution of the errors or instructions to repeat a portion of the installation process.

Similar issues are presented in connection with addressing project updates. In the context of operating stacks composed of projects from independent sources, e.g., multiple third parties or open source developers, it will be appreciated that updates generally will not be coordinated. That is, updates may occur at different times and may or may not have an impact on compatibility. The installation process described above can be implemented not only in connection with an initial installation, but also in connection with an update installation. That is, appropriate checks, installation sequencing, testing and the like can be designed and executed for a given update.

In this regard, update installations may be implemented automatically, upon manual retrieval of the update, or the user or an administrator of the client entity may be notified of the availability of an update. For example, a system operator may monitor the availability of updates for supported projects and download appropriate information to users or client entities. A user or client entity may then be advised of the availability of updates upon logging into a network, loading of a stack assembly, installation and support system, or selection of any affected project. Such updates may relate to updated project options and support materials as well as to updated software updates. The user or client entity may then select to install or not install the update. It will be appreciated that not all users/client entities may wish to install all updates in this regard.

It will thus be appreciated that the illustrated system provides a number of advantages with regard to the installation and update process and this installation process, considered independent of stack assembly or post-installation support, constitutes an important aspect of the present invention. That is, various elements of this installation process would provide advantages even in the context of a stack assembly developed independent of the present invention. However, even upon assembly and installation of a stack of multiple open source projects, certain post-installation support may be desired. The present invention provides significant advantages in this regard, as will be described below.

C. Post-Installation Support

Upon assembly and installation of an open source software stack, the stack is ready for use by the end user. However, a variety of post-installation functionality may be useful to allow optimal performance of the stack. The present invention provides a variety of functionality in this regard, as described below. Many users may benefit from a tutorial to educate the end user as to the proper use and capabilities of the installed stack. As noted above, tutorials are available for some open source software projects. However, such tutorials generally are not specifically adapted to provide instructions in the context of particular stacks that may be assembled. The present invention provides tutorials in the context of such stacks. The system described above supports a selected set of open source and other projects. These projects can be combined to define a large but finite set of software stacks. The knowledge base stores tutorial information for many or all of these stacks or subsets thereof. Upon installation of a stack, the associated tutorial or tutorials are made available to be run by the user.

Another important post-installation function relates to users manuals or other supporting documentation. As noted above, supporting documentation may be available in connection with individual open source projects. However, heretofore there has generally not been a convenient mechanism to obtain supporting documentation relating to a particular stack. This problem is addressed by the present invention by storing support documentation as structured XML documents. That is, chunks of supporting documentation text are associated with a tag system that links the text to particular projects, combinations of projects and overall stacks. For example, projects and stacks may be related by parent, child and other hierarchical tag structures. When a particular stack is installed, the relevant support documentation can be readily retrieved using the tag system to compile customized support documentation. Associated graphics may be assembled on a custom basis, also. The supporting documentation may be specifically provided for Linux, Windows, and/or other criteria specified by the user or indicated in the user machine information stored in the knowledge base and the appropriate documentation in this regard may be retrieved based on metadata (e.g., tag) associations.

It will be appreciated that the ability to provide custom tutorials and supporting documentation for an open source project, a combination of projects or an overall stack is an important advantage of the present invention that may be utilized independent of the stack assembly and installation tools noted above. For example, developers who have executed a custom stack installation independent of the tools noted above may wish to utilize the present invention to obtain supporting tutorials or documentation. For example, this may be accomplished by running logic resident on the developer's system or by accessing a website operative to provide such tutorials or documentation on a fee basis.

The combination of the flexibility of open source software and the ease of assembly and installation provided by the present invention yields a number of advantages that can not be readily realized in connection with proprietary systems or with open source software in the absence of the tools of the present invention. For example, a user may wish to try various stack options to determine which is optimal for a particular endeavor. For example, a user may wish to switch between different available database tools in connection with a particular open source software stack. In accordance with the present invention, a database switcher, or a switcher for other software components, may be provided. In this manner, the user can prompt the system to switch between one database and another. This system is operative as described above to integrate associated projects of a stack so that they point to the newly selected database. The user can then compare performance of the stack with one database tool (or other resource) and another database tool (or other resource). In this manner, optimization of performance for a particular endeavor can be conveniently achieved. It will be appreciated that proprietary systems generally do not accommodate comparison as between tools of competing providers. Open source systems theoretically allow for such comparisons but as a practical matter this cannot be performed due to the significant complexities associated with switching of tools and associated integration.

The system described above can be implemented a number of ways. For example, the associated logic may be disseminated in physical form to clients with updates provided periodically. Alternatively, the associated logic may be downloaded from an operator's website by a client entity and updates may be periodically downloaded in similar fashion. As a still further alternative, the system may be operated as a hosted application. In any event, use of the system may be licensed, for example, on a per user per year basis. In this regard, it may be desired to make information regarding such licenses available to the licensee while protecting the license information against unauthorized modification.

Figure 14:
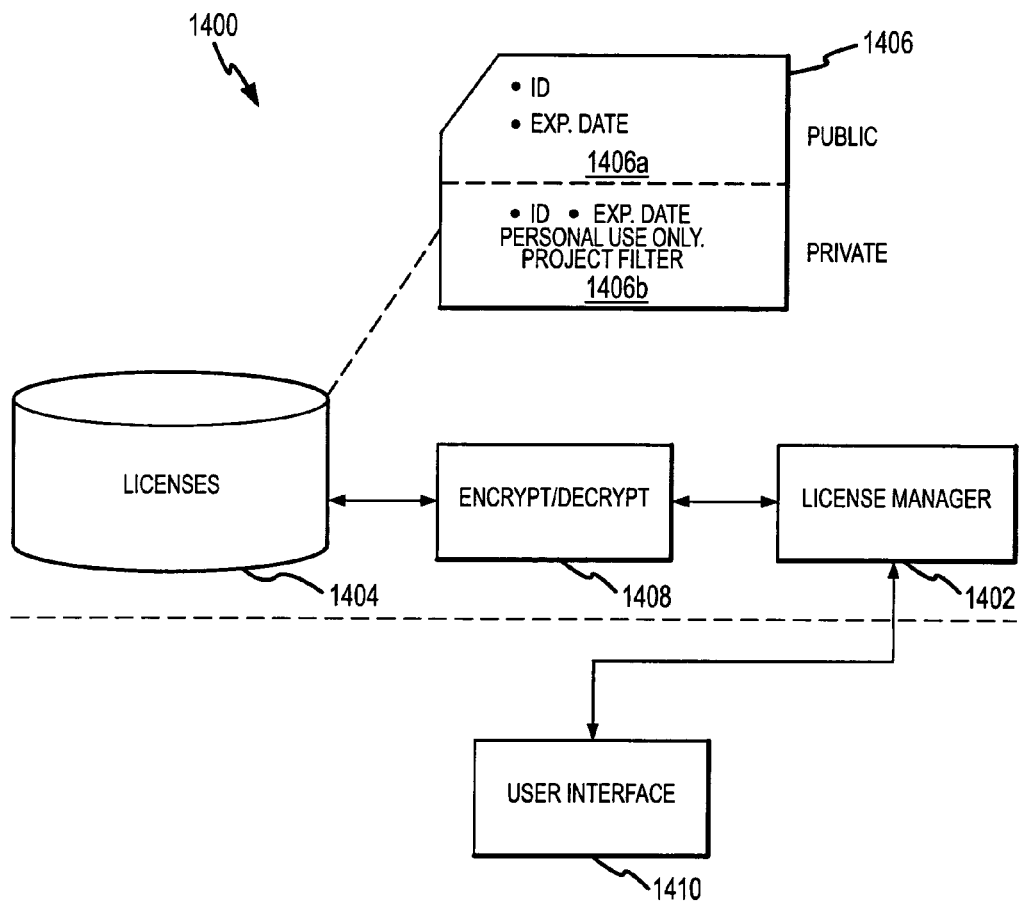
FIG. 14 is a schematic diagram of a license management system in accordance with the present invention.

FIG. 14 is a schematic diagram illustrating a system 1400 for managing such license information. The illustrated system includes a license manager 1402 for managing information that is available to the user via a user interface 1410. The system 1400 may be resident on the client equipment of the system provider, or another location, and may be distributed across multiple platforms. The license manager 1402 is operative to receive requests for license information entered via the user interface 1410 and to manage access to license information of 1404. In this regard, the license information 1404 includes license files 1406 for individual licenses. The license file 1406 includes a public portion 1406a and a private portion 1406b. The information available in the public portion 1406a and private portion 1406b may overlap to an extent but the private portion 1406B will generally include additional information. In the illustrated implementation, the public portion includes, for example, a license identification and an expiration date. Such information may be used, for example, to enable the user to identify the license at issue and obtain information of legitimate use to the client entity.

The private portion 1406b may include additional information, such as information defining the license term, as to which access is to be limited. The private portion of 1406b can be accessed by an authorized individual, for example, to update the expiration date or to add licensed seats. This is accomplished by entering license identification information via the user interface 1410 and requesting access to the restricted access fields. In response to such an access request, the user is prompted to enter a password or other security information. This password information is used to encrypt information entered into the private portion of 1406 or to decrypt information from the private portion 1406b. In this manner, appropriate license information is made available while protecting restricted access information such as information fundamental to enforcement of the license terms.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed:

1. A method for use in installing software packages of uncoordinated software applications, comprising the steps of:
    first operating a computer based tool to receive information from a graphical installation tool identifying a first software application and a second software application to be installed as an integrated software package, wherein said first software application is available from a first source and said second software application is available from a second source, wherein said first and second software applications are uncoordinated, wherein at least one of said first and second software applications is an open source software application, and wherein at least one of said first and second software applications is an application development project that operates at a tools or applications layer of said integrated software package above an operating system level of said integrated software package;
    second operating said computer based tool to retrieve from storage information concerning installation requirements for said first and second software applications;
    processing said information using said computer based tool to determine an installation procedure for said integrated software package including said application development project; and
    executing said installation procedure using said computer based tool.

2. A method as set forth in claim 1, wherein said retrieved information relates to resources required by said first and second software applications.

3. A method as set forth in claim 2, wherein said resources comprise one of ports and files used by said first and second software applications.

4. A method as set forth in claim 2, wherein said step of executing comprises performing a series of checks to identify potential conflicts concerning said resources.

5. A method as set forth in claim 1, wherein said step of processing comprises determining a sequence for installing said first and second software applications.

6. A method as set forth in claim 1, wherein said step of executing comprises configuring at least one of said first and second software applications for an identified database.

7. A method as set forth in claim 1, wherein said step of executing comprises running a test dependent on said first and second software applications to confirm proper installation and operation of said first and second software application.

8. A method as set forth in claim 1, further comprising the steps of receiving, from said graphical installation tool after said step of executing, update information identifying an update for one of said first and second software applications, processing said update information using said computer based tool to obtain a further installation procedure for said update, and executing said further installation procedure using said computer based tool.

9. A method as set forth in claim 1, further comprising the steps of receiving, from said graphical installation tool after said step of executing, update information identifying an update for one of said first and second software applications and prompting a user for instructions concerning said update.

10. A method as set forth in claim 1, further comprising the step of operating said computer based tool to execute an application filter whereby said first and second software applications are selected based on filter criteria defining a client policy and license information regarding one of access to and use of software applications.

11. A method as set forth in claim 1, further comprising the step of substituting, after said step of executing, for one of said first and second software applications, a substitute software application having substantially equivalent functionality.

12. A system operable to install software, comprising:
a configuration module for configuring a plurality of unco-ordinated software applications into an integrated software package and determining an installation procedure for said integrated software package, wherein said unco-ordinated software applications are available from independent sources and are free of specific preconfiguration for cooperative and dependent operation in said integrated software package, wherein at least one of said uncoordinated software applications is an open source software application; and wherein at least one of said uncoordinated software applications is an application development project that operates at a tools or applications layer of said integrated software package above an operating system level of said integrated software package; and
a memory for storing said plurality of uncoordinated software applications;
an installer for installing said integrated software package on a computer according to said installation procedure for said integrated software package including said application development project.

13. A system as set forth in claim 12, wherein the integrated software package is a compilation of the plurality of uncoordinated software applications into a plurality of dependent software applications.

14. A system as set forth in claim 13, further comprising a shared resource, wherein the shared resource comprises a function; a constant; a class; an object; a structure; and/or license information, and wherein the plurality of dependent software applications are operable to use at least a portion of the shared resource.

15. A system as set forth in claim 12, wherein said configuration module is further operative for configuring said integrated software package, after installation of said integrated software package on said computer, with respect to an update for one of said software applications.

16. A system as set forth in claim 12, wherein said configuration module is further operative for prompting a user for instructions regarding an update available for one of said software applications.

17. A system as set forth in claim 12, wherein said configuration module is further operative for executing an application filter whereby said plurality of uncoordinated software applications are selected based on filter criteria defining a policy regarding one of access to and use of software applications.

18. A system as set forth in claim 12, wherein said installer is further operative for substituting for a first software application of said integrated software package a substitute software application having substantially equivalent functionality.

19. An apparatus for use in installing packages of uncoordinated software applications comprising:
interface logic for receiving package information identifying an integrated software package including a plurality of uncoordinated software applications to be installed on a processing platform, wherein said software applications are separately available from individual sources, wherein said software applications include a least one open source software application, and wherein at least one of said software applications is an application development project that operates at a tools or applications layer of said integrated software package above an operating system level of said integrated software package;
storage for storing installation information related to said plurality of uncoordinated software applications, wherein said installation information includes installation requirements for said plurality of uncoordinated software applications; and
processing logic for selectively accessing said installation information based on said package information, determining an installation procedure for said integrated software package including said application development project, and executing said installation procedure.

20. An apparatus as set forth in claim 19, wherein said processing logic is operative for performing a series of checks to identify potential conflicts concerning resources required by said plurality of uncoordinated software applications.

21. An apparatus as set forth in claim 19, wherein said processing logic is operative for determining a sequence for installing said plurality of uncoordinated software applications.

22. An apparatus as set forth in claim 19, wherein said processing logic is operative for running a test dependent on said plurality of uncoordinated software applications to confirm proper installation and operation of said software applications.

23. An apparatus as set forth in claim 19, wherein said processing logic is operative for receiving information identifying an update for one of said uncoordinated software applications, processing said update information to obtain a further installation procedure for said update, and executing said further installation procedure.

24. An apparatus as set forth in claim 19, wherein said processing logic is operative for receiving update information identifying an update for one of said uncoordinated software applications and prompting a user for instructions concerning said update.

25. An apparatus as set forth in claim 19, wherein said processing logic is further operative for executing an application filter whereby said plurality of uncoordinated software applications are selected based on filter criteria defining a policy regarding one of access to and use of software applications.

26. A system operable to install software, comprising:
storage for storing information regarding at least one open source software component for inclusion in an integrated software package, wherein at least one of said open source software components is an application development project that operates at a tools or applications layer of said integrated software package above an operating system level of said integrated software package;
a filter that compares first filter information for a computer to second filter information of said at least one open source software component; and
an installer that determines an installation procedure for the computer to install said integrated software package including said application development project based on a comparison of the first and second filter information.

27. A system as set forth in claim 26, wherein the storage further stores information regarding at least one proprietary software application.

28. A system as set forth in claim 26, wherein said second filter information includes an association with respect to one of a General Public License, a Lesser General Public License, and a proprietary license.

* * * * *

UNITED STATES PATENT AND TRADEMARK OFFICE
CERTIFICATE OF CORRECTION

| | | |
|---|---|---|
| PATENT NO. | : 7,669,199 B2 | Page 1 of 1 |
| APPLICATION NO. | : 11/118099 | |
| DATED | : February 23, 2010 | |
| INVENTOR(S) | : Cope et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1244 days.

Signed and Sealed this

Fourth Day of January, 2011

David J. Kappos
*Director of the United States Patent and Trademark Office*